(12) United States Patent
Umemura et al.

(10) Patent No.: US 7,257,202 B2
(45) Date of Patent: Aug. 14, 2007

(54) TELEPHONE COMMUNICATION SYSTEM

(75) Inventors: Masaya Umemura, Yokosuka (JP); Takeo Tomokane, Yokohama (JP); Kazushige Hiroi, Machida (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 10/651,258

(22) Filed: Aug. 29, 2003

(65) Prior Publication Data

US 2005/0031092 A1    Feb. 10, 2005

(30) Foreign Application Priority Data

Aug. 5, 2003    (JP)    ............... 2003-205941

(51) Int. Cl.
*H04M 11/06*    (2006.01)
(52) U.S. Cl. ............... 379/88.14; 379/88.13; 348/14.11
(58) Field of Classification Search ............. 348/14.11; 379/88.13, 88.14
See application file for complete search history.

(56) References Cited

U.S. PATENT DOCUMENTS 5,790,180 A * 8/1998 Wild .................. 348/14.11

FOREIGN PATENT DOCUMENTS

JP    P2001-326972 A    11/2001

\* cited by examiner

*Primary Examiner*—Gerald Gauthier
(74) *Attorney, Agent, or Firm*—McDermott Will & Emery LLP

(57) ABSTRACT

A video-phone call with a portable video-phone terminal is enabled for a cellular phone which has not video-phone service provided, by making use of cameras and display devices placed on the street. For a video-phone call to a portable video-phone terminal, a media converter in a service center distributes data so as to send video data to a public communication terminal on the street, and voice data to a cellular phone without video recording/reproducing capability. A call agent in a service center issues an ID in response to a request from the cellular phone without video recording/reproducing capability on voice call. This ID may be received by a service center via a detector such as a sensor deployed on the street, to provide a video-phone service by using a public communication terminal on the street in the vicinity of the detector.

31 Claims, 26 Drawing Sheets

FIG. 7
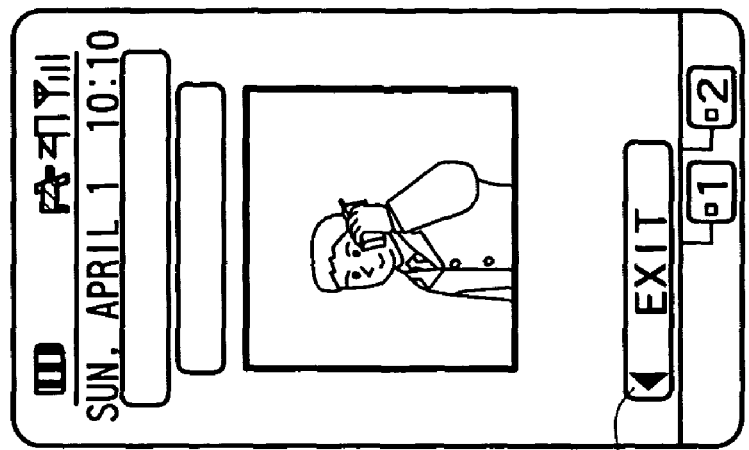
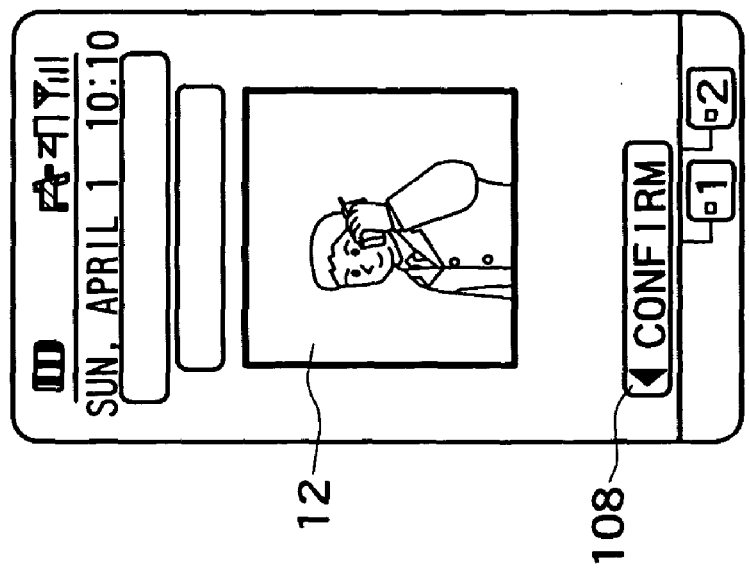
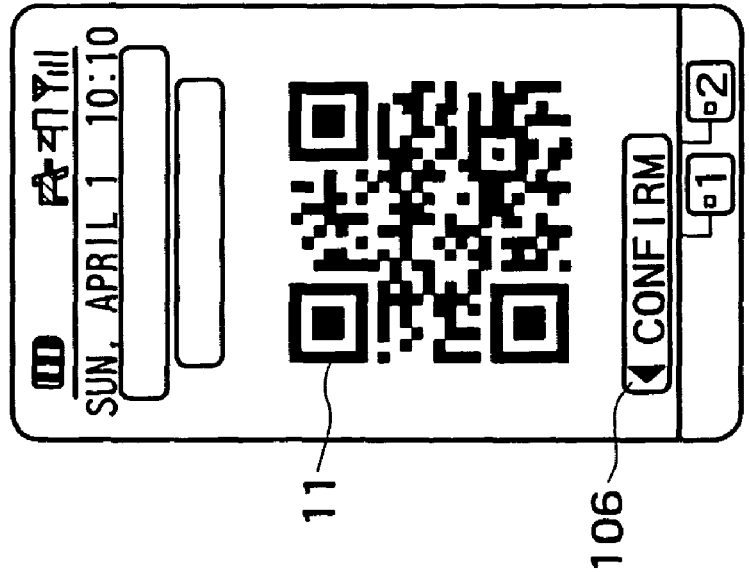

FIG. 10
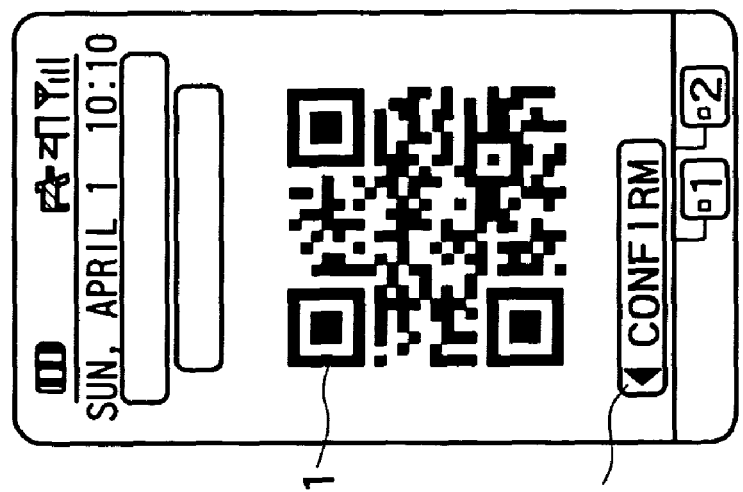
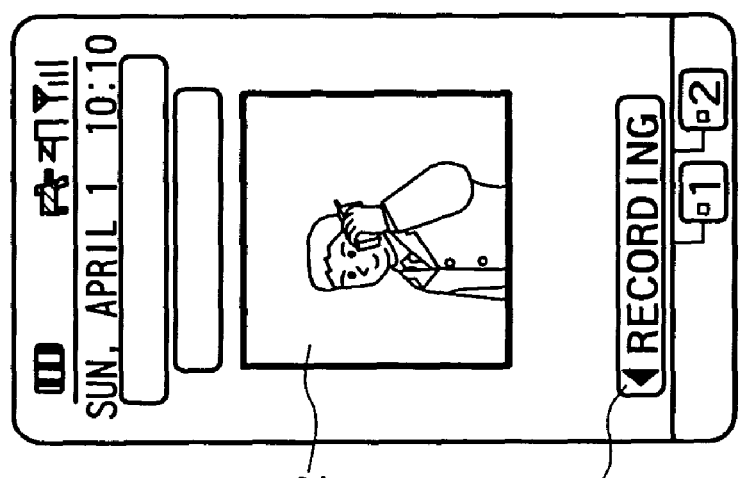
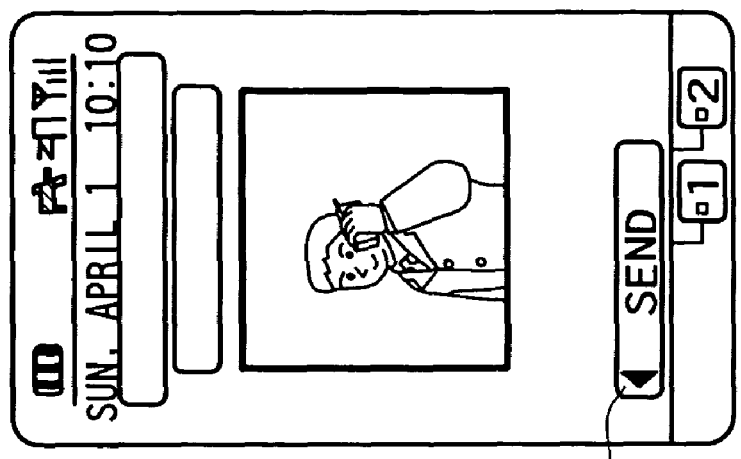

F I G. 1 5
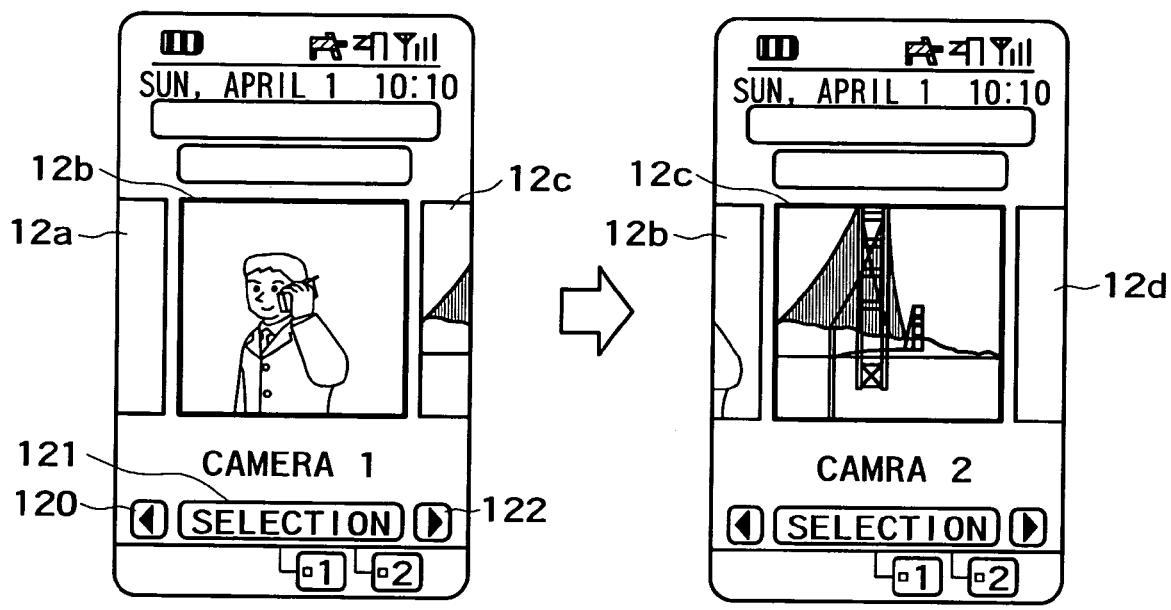

FIG. 18

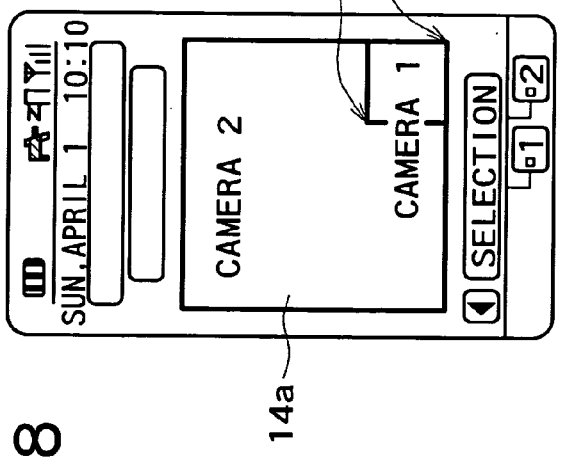

BORDER COORDINATES

DISPLAY AREA ATTRIBUTES

PRIMARY VIDEO OVERLAY INHIBITION,
PRIMARY VIDEO PRIORITY REPRODUCE,
WIPE SCREEN PRIORY REPRODUCE,
PRIMARY VIDEO TO WIPE SCREEN SWITCHING INHIBITION,
WIPE SCREEN DISPLAY/NON-DISPLAY SWITCHING INHIBITION,
WIPE SCREEN BORDER COORDINATES(TOP),
WIPE SCREEN BORDER COORDINATES(BOTTOM),
OVERLAY INHIBITION

| ATTRIBUTES | HEADER | COMPOSED | COMPOSED | COMPOSED | COMPOSED |

MPEG-4 STREAM

| ATTRIBUTES | HEADER | CAM 2 | CAM 1 | HEADER | CAM 1 | CAM 2 | CAM 1 |

MPEG-4 STREAM

VIDEO-PHONE CALL

| | | |
|---|---|---|
| VIDEO(→) | PORTABLE VIDEO-PHONE | PORTABLE VIDEO-PHONE |
| VOICE(→) | PORTABLE VIDEO-PHONE | PORTABLE VIDEO-PHONE |
| VIDEO(←) | PORTABLE VIDEO-PHONE | PORTABLE VIDEO-PHONE |
| VOICE(←) | PORTABLE VIDEO-PHONE | PORTABLE VIDEO-PHONE |

141

COMPOSITE CALL

| | | | |
|---|---|---|---|
| VIDEO(→) | STREET CAMERA<br>PORTABLE VIDEO-PHONE | COMPOSITE (CENTER) | PORTABLE VIDEO-PHONE |
| VOICE(→) | PORTABLE VIDEO-PHONE | PASS-THROUGH (CENTER) | PORTABLE VIDEO-PHONE |
| VIDEO(←) | PORTABLE VIDEO-PHONE | | PORTABLE VIDEO-PHONE |
| VOICE(←) | PORTABLE VIDEO-PHONE | | PORTABLE VIDEO-PHONE |

142

COMPOSITE CALL USING
EXTERNAL DISPLAY DEVICE

| | | | |
|---|---|---|---|
| VIDEO(→) | STREET CAMERA<br>PORTABLE VIDEO-PHONE | COMPOSITE (CENTER) | PORTABLE VIDEO-PHONE |
| VOICE(→) | PORTABLE VIDEO-PHONE | PASS-THROUGH (CENTER) | PORTABLE VIDEO-PHONE |
| VIDEO(←) | PORTABLE VIDEO-PHONE | | PORTABLE VIDEO-PHONE |
| VOICE(←) | PORTABLE VIDEO-PHONE | | PORTABLE VIDEO-PHONE |

143

COMPOSITE CALL USING
EXTERNAL CAMERA AND
DISPLAY DEVICE

| | | | |
|---|---|---|---|
| VIDEO(→) | STREET CAMERA | PASS-THROUGH (CENTER) | PORTABLE VIDEO-PHONE |
| VOICE(→) | PORTABLE VIDEO-PHONE | PASS-THROUGH (CENTER) | PORTABLE VIDEO-PHONE |
| VIDEO(←) | EXTERNAL DISPLAY DEVICE | PASS-THROUGH (CENTER) | PORTABLE VIDEO-PHONE |
| VOICE(←) | PORTABLE VIDEO-PHONE | PASS-THROUGH (CENTER) | PORTABLE VIDEO-PHONE |

TELEPHONE COMMUNICATION SYSTEM

BACKGROUND OF THE INVENTION

The present invention relates to a telephone communication system, more specifically to a video-phone system using a cellular phone without the capability of video (motion picture) recording and reproducing, and a camera and display device deployed for public use or on the street.

An exemplary Prior Art is shown in FIG. 13. In the figure, reference numeral 1 is designated to a cellular phone without the capability of moving picture recording and reproducing, 6 to a portable video-phone device, 8 to a cellular phone network, 80 to a voice format conversion server between the cellular phone 1 and the portable video-phone 6.

In the Prior Art, for the communication between the cellular phone 1 without the capability of video recording and reproducing and the portable video-phone 6, only voice communication is provided by the cellular network 8. The voice format conversion server 80 converts format from PCM voice data to digitally compressed voice data and vice versa in order to achieve voice communication.

In a video-phone system disclosed in the Japanese Published Unexamined Patent Application No. 2001-326972 (patent reference #1) entitled as "video-phone system in a mobile multimedia terminal", which uses the packet communication of the cellular network, a video-phone unit having a personal handy-phone system (PHS) wireless terminal is to be provided in addition to a cellular phone terminal or a cellular phone terminal having a personal handy-phone system (PHS) wireless terminal integrated to ensure the communication line to another video-phone unit. The video-phone unit achieves a video-phone by using the packet communication of a cellular network from the cellular phone through the above mentioned communication line.

Patent Reference 1;
Japanese Unexamined Patent Application Publication No. 2001-326972

In the Prior Art video-phone capability and voice communication are both enabled between two portable video-phone units 6. The communication between a portable video-phone unit 6 and a cellular phone without the capability of video recording and reproducing 1, voice communication only is allowed by using the voice format conversion by the media converter in a service center. Since the cellular phone without the capability of video recording and reproducing 1 has no capability of video recording and reproducing, video-phone communication has been physically impossible.

In the Prior Art disclosed in the reference #1 "video-phone system in a mobile multimedia terminal", a user has to possess or rent a cellular phone terminal having a video-phone unit and a personal handy-phone system unit integrated therein. This may force some users to replace their conventional phone unit to a specific cellular phone unit having a personal handy-phone system (PHS) wireless terminal built-in.

The lifetime of battery is so shorter for the practical use since the user needs to have a specific cellular phone terminal having a video-phone unit and a PHS wireless terminal and to turn them on to be connected with both terminals during waiting.

Also this system uses a packet network operating as "best-effort" method, which does not ensure the communication bandwidth, the bandwidth required for the video data may or may not be allocated as well as there is a delay considerable due to the overhead caused by the relaying the cellular phone having a personal handy-phone system (PHS) wireless terminal integrated, resulting in a too high rate of image dropout for a practical use.

As have been described above the conventional cellular phone or the art described in the reference #1 have failed to solve the incompatibility with the portable video-phone and to provide a reasonable bandwidth and sufficiently short delay in order to provide a better service.

SUMMARY OF THE INVENTION

Therefore it is an object of the present invention to provide a communication between a cellular phone and a portable video-phone terminal.

It is another object of the present invention to provide a system that enables video-phone calls by using a cellular phone without the capability of video recording and reproducing.

The present invention allows a call between a first phone terminal having the capabilities of voice communication, data communication, video recording, compression/expansion of recorded video and reproduce/display of recorded video, and a second phone terminal lacking at least one of capabilities of video recording, compression/expansion of recorded video and reproduce/display of recorded video. To do this, a call agent connected to a communication network for call control of the called phone terminal, a service center having a media converter for converting image data and voice data, a public communication terminal connected to the service center and having a display device and a video recording device are used. The service center controls calls between the first and second phone terminals through the call agent, and communicates to the first phone terminal with a format including video data and voice data through a media converter, and communicates to the public communication terminal with video data through the media converter.

In a preferred embodiment a camera and display device is deployed, as a public communication terminal, for example on the street or in an office, and a service center performs remote control of such communication terminals. For a video-phone call to a portable video-phone terminal (a first phone terminal) the service center directs video data to a designated public communication terminal and voice data to a cellular phone (a second phone terminal) having no video recording/reproducing capability. The call agent of the service center issues an identifier (ID) in response to a request from the on-call cellular phone without video recording/reproducing capability. The ID will be displayed on the display of the cellular phone. When a user presents that ID displayed on the cellular phone to a detection device such as a sensor or a scanner placed on the street, and the detected result of that ID will be sent to the service center. The service center in turn will actuate the nearest one of public communication terminals deployed around the detector to provide a video-phone call service thereto. As such a user may be able to make a video-phone call by using a public communication terminal along with his/her cellular phone without video reproducing capability.

BRIEF DESCRIPTION OF THE DRAWINGS

FIG. 4 is a schematic diagram illustrating data conversion to the video-phone format in a service center 4a;

FIG. 5 is a schematic diagram illustrating video and voice extraction from the video-phone format in a service center 4a;

FIG. 7 is a schematic diagram of a display screen of a cellular phone without video recording/reproducing capability in accordance with the second preferred embodiment;

FIG. 10 is a schematic diagram of a display screen of a cellular phone without video recording/reproducing capability in accordance with the third preferred embodiment;

FIG. 15 is a schematic diagram illustrating camera selection in the fifth preferred embodiment;

FIG. 18 is a schematic diagram illustrating the stream data format of MPEG-4 and attribute values of display area attribute in the fifth preferred embodiment;

FIG. 26 is a schematic diagram of a seventh preferred embodiment of the present invention.

DESCRIPTION OF EMBODIMENTS

Now referring to FIGS. 1 to 5, a first preferred embodiment of the present invention will be described in greater details.

Figure 1:
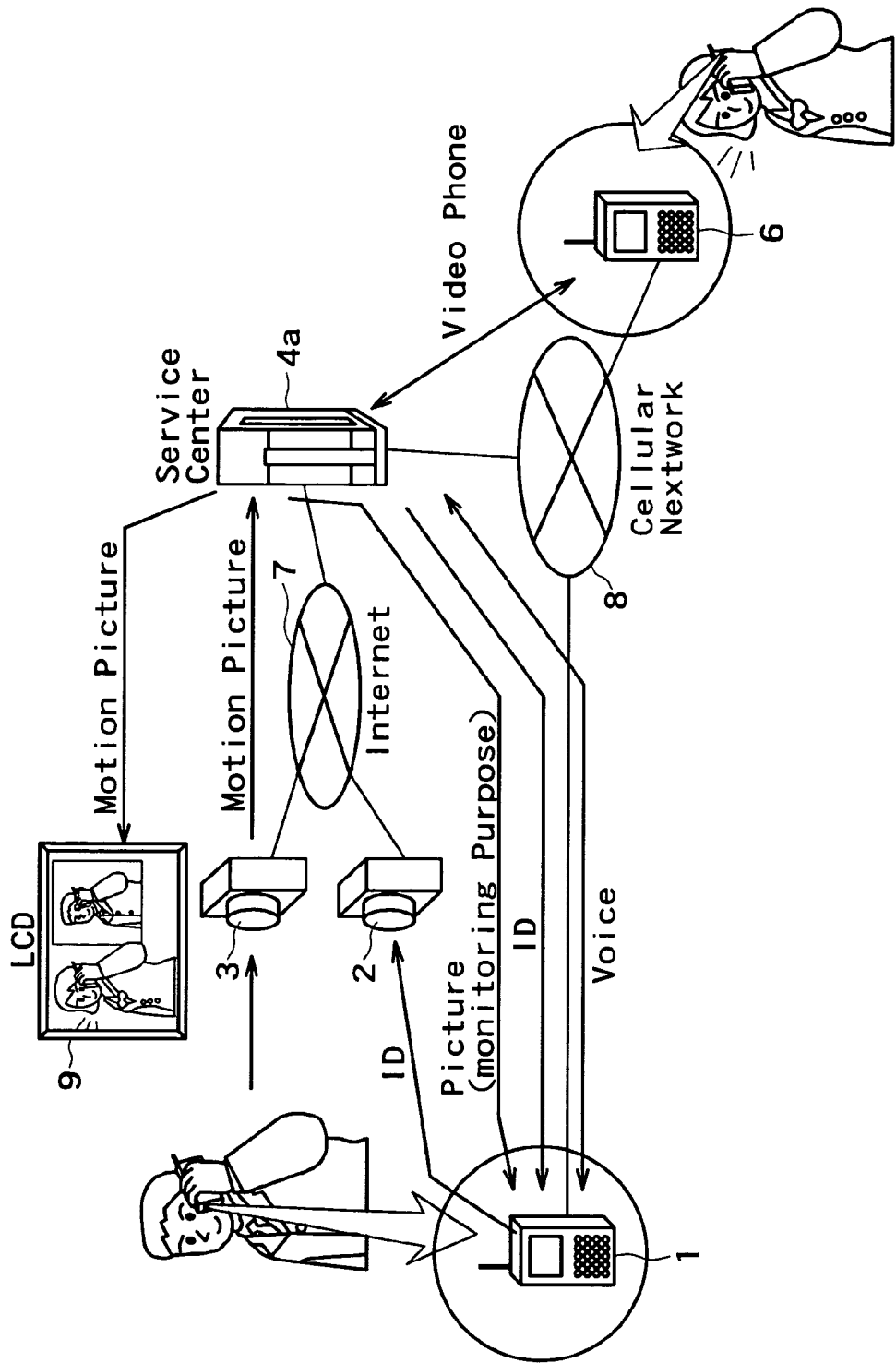
FIG. 1 is a schematic diagram of a telephone communication system indicative of a first preferred embodiment of the present invention.

In FIG. 1, reference numeral 1 is designated to a cellular phone without video recording/reproducing capability, 2 to a sensor or a camera on the street, 3 to a camera on the street, 4a to a service center, 6 to a portable video-phone terminal, 7 to the Internet, 8 to a cellular phone network, 9 to a display placed on the street.

In FIG. 1, a user will place a call between a cellular phone without video recording/reproducing capability 1 and a portable video-phone terminal 6 through a cellular phone network 8. Although a service center 4a may be composed of a plurality of call agents and a plurality of media converters and distributed on the cellular phone network 8, for the sake of clarity one service center 4a is illustrated in the figure. A call from the cellular phone will be received by the call agent, which will call a called cellular phone. If the voice format is different among cellular phones, a media converter of the service center 4a in response to the direction of the call agent will convert the voice data format from and to for example PCM, half-rate (PSI-CELP) method to and from AMR voice compression and expansion. This conversion in accordance with the preferred embodiment of the present invention allows a voice call between a cellular phone without video recording/reproducing capability 1 and a portable video-phone 6.

During a call, the user may call the service center 4a from the cellular phone without video recording/reproducing capability 1 to request an ID for a video-phone call service and to obtain it. The ID may be consisted of alpha-numerical code or binary code such as for example the phone number of the user, date and time, the identification number allocated to the on-call session between two cellular phones, billing charge code or suffix or subclass of charge code, so as to facilitate the processing at the service center 4a. The ID may be sent as a bit-mapped image data by generating a bar-code at the service center 4a instead of sending directly to the cellular phone.

In the first preferred embodiment although an active ID request by a user has been described, the service center 4a may recognize the call to a portable video-phone 6 and send an ID for providing the video-phone call service to the cellular phone without video recording/reproducing capability 1 to promote the use of video-phone calls.

Alternatively, the ID may be generated based on a unique phone number or terminal-specific number stored on the SIM card in the cellular phone without video recording/reproducing capability 1, or based on a combination of such a number with the date and time, unique identification number of the connected base station of the cellular phone network 8.

From the requested ID a bar-code will be generated on the cellular phone without video recording/reproducing capability 1 to display on the display screen of the terminal. The user will present the cellular phone without video recording/reproducing capability 1 in hand from his/her ear to a sensor or camera 2 on the street. The sensor or camera 2 will scan the display screen and decode the ID to notify service center 4a. During this processing the call connected between cellular phones is held active so that the user may put the cellular phone without video recording/reproducing capability 1 on the ear to resume the call.

The sensor or camera on the street may be a conventional CCD or CMOS sensor or camera, which will scan in the visible light range. Since a CCD and CMOS sensor or camera may receive infrared (IR) light by blocking the visible light, an ID may be presented via an infrared communication by means of an IrDA Infrared Data Communication Port of the cellular phone.

The service center 4a after having verified the validity of the presented ID, will actuate the camera 3 on the street to start image capturing. Captured images may be in the format of still images such as JPEG or GIF to be sent to the cellular phone without video recording/reproducing capability 1 to display thereon. The user will verify based on the displayed image that the camera position is correct and the user himself/herself is captured and will notify the service center 4a of the confirmation. The service center 4a in this confirmation step may collect a plurality of images from a plurality of cameras 3 around or near the user position to sequentially send them to the cellular phone without video recording/reproducing capability 1 so as to allow the user to select the appropriate one among them in order to decide the camera 3 on the street to be used for the communication.

The service center 4a on reception of the notification, will ask the portable video-phone 6 that the communication will be switched from voice call to video-phone call. As soon as the portable video-phone 6 accepts the switching, the media converter of the service center 4a will receive video data from the appropriate camera 3 on the street to convolve the video data with the voice data from the cellular phone without video recording/reproducing capability 1 flew on the cellular phone network 8 to convert to the data format of the video-phone in order to send to the portable video-phone 6.

Simultaneously, the portable video-phone 6 will send the video and voice data to the cellular phone network 8 in the data format of the video-phone. The media converter in the service center 4a will split data into video and voice and convert if needed to send voice data to the cellular phone without video recording/reproducing capability 1. The video data on the other hand will be sent to the display device 9 on the street to display in a way so-called "picture-in-picture" at the same time as the video data from the camera 3 on the street. The picture-in-picture display may be realized by synthesizing the video data from the portable video-phone 6 and data from the camera 3 in the display device 9 and displaying them in each respective area. Alternatively the data may be combined in the service center 4a and displayed on the display device 9.

In the first preferred embodiment of the present invention the cameras 3 and the sensors or cameras 2 will be deployed on the street. Alternatively the sensor or camera 2 on the street may be used to capture the user image instead of the camera 3 to omit the camera 3.

Figure 2:
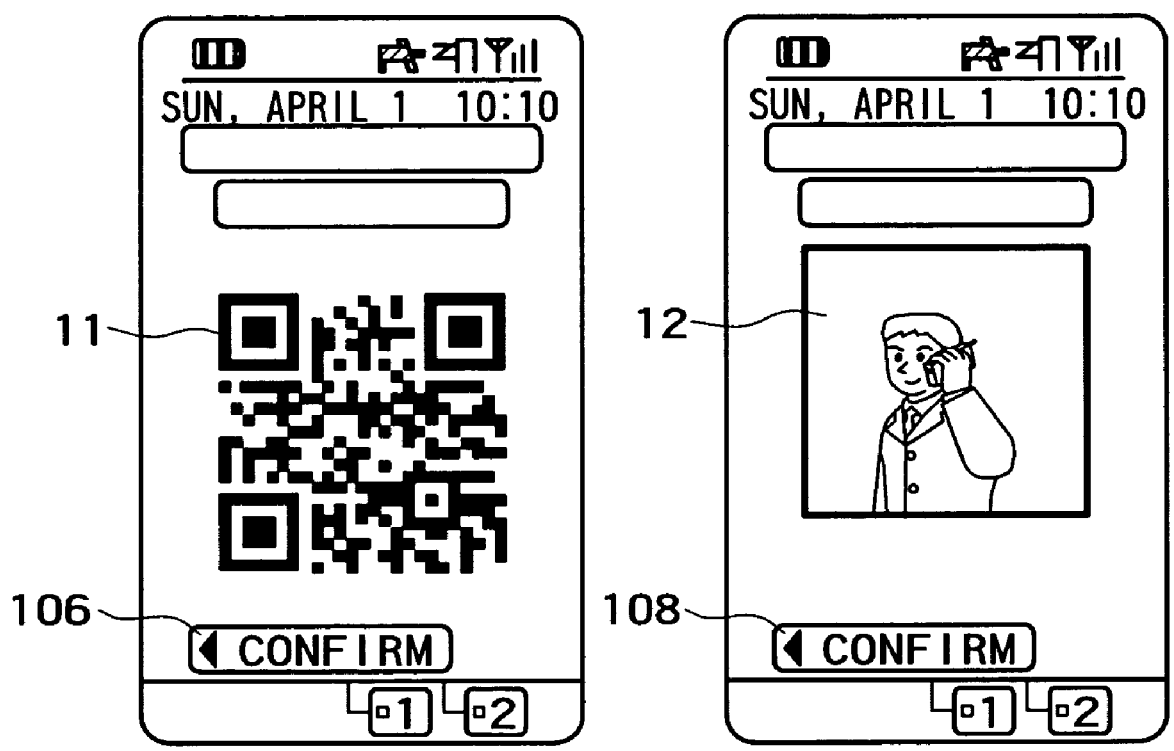
FIG. 2 is a schematic diagram of a display screen of a cellular phone without video recording/reproducing capability in accordance with the first preferred embodiment.

In FIG. 2 the reference numeral 11 is designated to two dimensional bar-code, 12 to a still image of the user captured by the street camera, 106 and 108 to buttons. When the user presents an ID the two dimensional bar-code 11 will be displayed on the display screen of the terminal. The bar-code may also be one dimensional bar-code or a bit-mapped data. The user after presented a bar-code will press a key on the cellular phone without video recording/reproducing capability 1 corresponding to the button 106 to terminate the bar-code display.

The service center 4a after having verified the validity of the ID presented will actuate the camera 3 on the street, and captured image will be sent to the cellular phone without video recording/reproducing capability 1 to display as a still image 12 of the user captured by the street camera. The user will confirm the contents of the still image that the camera position is correct and the user himself/herself is imaged, then will press a key on the cellular phone without video recording/reproducing capability 1 corresponding to the button 108 to notify the service center 4a.

Figure 3:
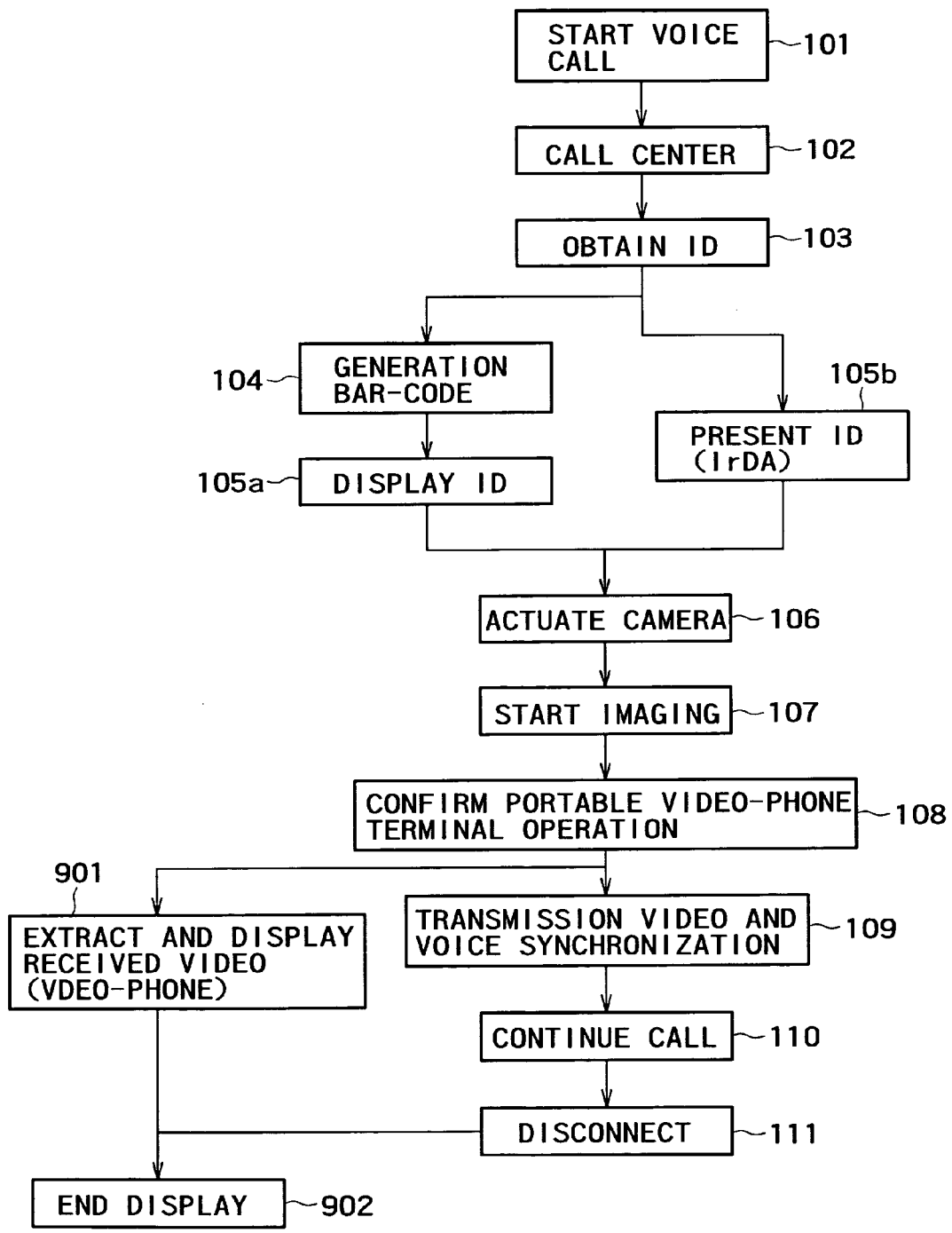
FIG. 3 is a flow diagram of sequential operation of the system embodying the first preferred embodiment.

Now referring to FIG. 3 the operational flow of the inventive system will be described.

As shown in FIG. 1, after starting voice call 101, the user of the cellular phone without video recording/reproducing capability 1 will call the center 102, then attempt to obtain an ID 103 and will have an ID. The ID may be presented via IrDA 105b, or after generating a bar-code 104 ID may be presented 105a on the display screen of the cellular phone without video recording/reproducing capability 1 to the sensor or camera 2 on the street.

The service center 4a, after having verified the validity of the ID presented, will actuate a camera 106, then will start capturing an image 107 and obtain an image captured by the camera 3 on the street. The captured image will be sent in a still image format to the cellular phone without video recording/reproducing capability 1 to help promoting the confirmation of a public video-phone call operation 108, and if verified the service center 4a will notify the portable video-phone 6 of the switching from voice call to video call, and then if accepted the service center 4a will start sending video-voice synchronization 109 to send to the portable video-phone 6 the data in the video-phone format. At the same time, the service center 4a will perform arrival video split 901 on the data arriving from the portable video-phone 6 in the format of video-phone to display on the display device 9. After having held as video-phone call 110 and when hanging up 111, the display device 9 on the street will terminate the display 902 to complete one session of the video-phone call.

Figure 4:
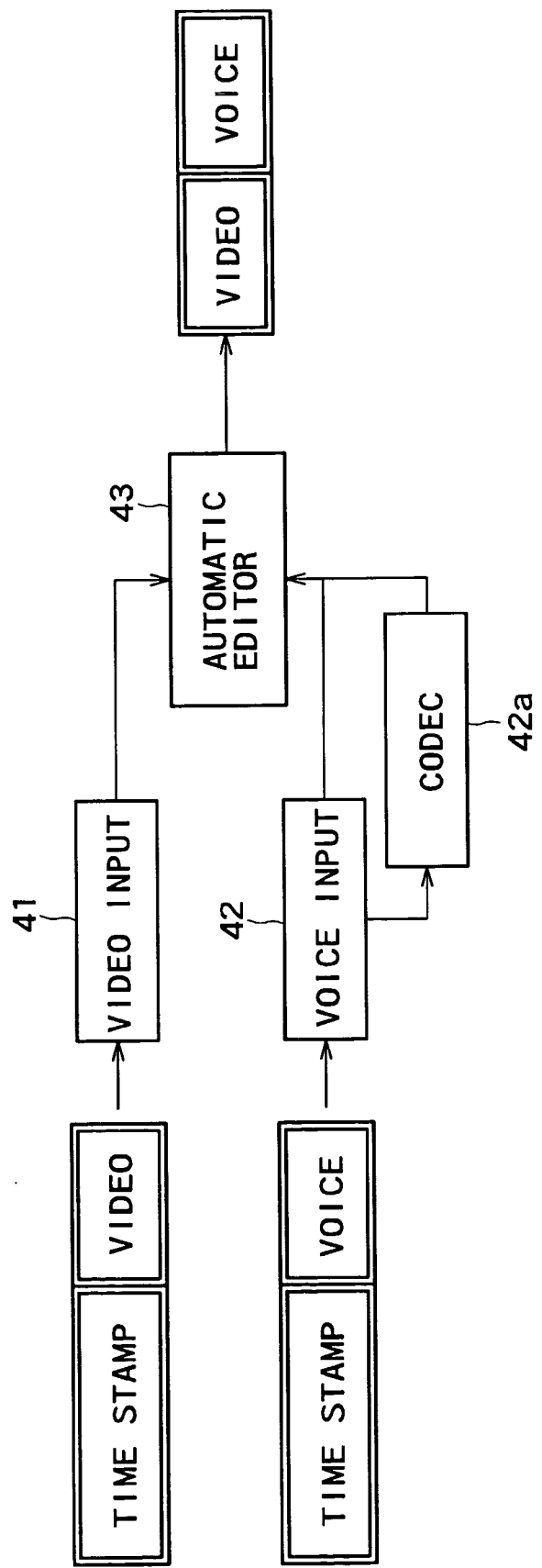

In FIG. 4, reference numeral 41 is designated to video input, 42 to voice input, 42a to a codec, and 43 to an automatic editor.

In FIG. 4, there is shown data conversion to the video-phone format in a media converter of a service center 4a. The media converter of the service center 4a may have a video input 41 and an voice input 42, and will convert input voice data to an appropriate format by a codec 42a if voice format conversion is necessary, so as to input to an automatic editor 43.

Since the video and voice data have respectively a time stamp, the automatic editor 43 may compare stamps to find a pair of almost simultaneous video and voice data in order to process to the video-phone format. In the inventive system, since the video data may be likely to tend to be dropped out or delayed when compared to the voice data, a media converter in the service center 4a, prior to switching from a voice call to a video-phone call, through which data transfer path from the camera 3 may become the shortest, will be found to change the path so that the delay during transmission will be minimum. Regardless of the presence or absence of the path control, with respect to the real time referred by the automatic editor 43, the larger one of delays of the time stamp of voice data and of the time stamp of video data will be used as the amount of delay at the input terminal of the automatic editor 43. In this way the voice data having an older time stamp than the time determined by subtracting the delay of the automatic editor 43 from the real time (i.e., deadline) will be suspended in a buffer of the automatic editor 43, the suspended data will be paired with the input video data having almost simultaneous time stamp, and will be converted to the video-phone format. At the time when the above deadline matches to the time stamp the data will be output to send to the portable video-phone 6. The automatic editor 43 will use this data pair as the reference and considering that both video and voice data thereafter will be almost simultaneous, to convert to the video-phone format, output and send at the time when respective time stamp matches to the deadline.

When the deadline has arrived while video data is being dropped out, video data used for the conversion to the video-phone format will be substituted by the data of one frame earlier. When the automatic editor 43 determines an absence of video data, the substitution of video data will be repeated until the dropout will be terminated. When video data arrives which may have been dropped out in a period, the substitution of video frames will be continued, during the period of time that the video data arrives intermittently. If data arrives one after another successively, video data other than the one having the latest time stamp will be discarded and the delay will be calculated again based on this latest time stamp. The automatic editor 43 in this situation will determine that the chronic delay has been occurred and will update the deadline based on this delay. At the time of updating the deadline the voice data to be converted to the video-phone format will be corrected or completed either by pitch control or by mute data.

Figure 5:
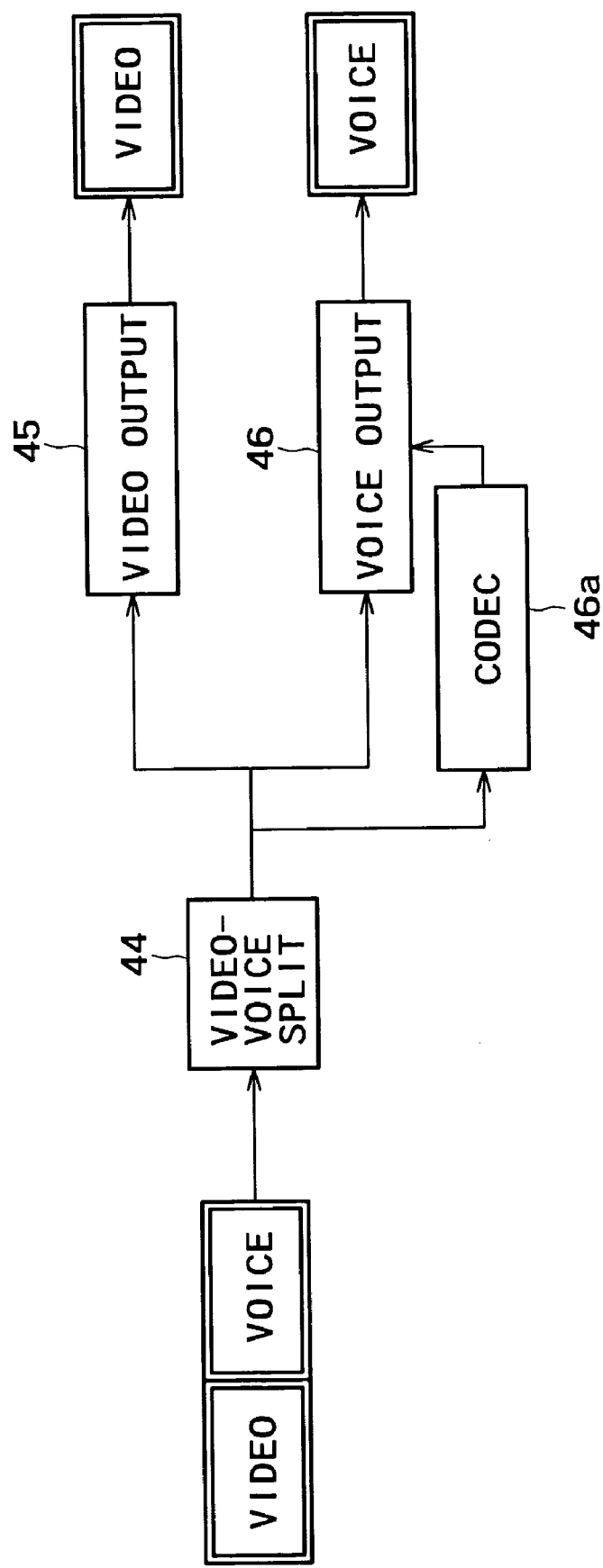

In FIG. 5 reference numeral 44 is designated to video-voice split, 45 to video output, 46 to voice output, and 46*a* to a codec.

The separation between video and voice data from within the video-phone format data at a media converter in a service center 4*a* is shown with reference to FIG. 5. The media converter of the service center 4*a* has a video-voice split 44, video output 45, and voice output 46, may convert and output the extracted voice data to an appropriate format in the codec 46*a*, if conversion of voice format is required. Output video data will be sent to the display device 9 on the street, voice data through the cellular phone network 8 to the cellular phone without video recording/reproducing capability 1, and both will be reproduced at almost same time through the display device 9 and the cellular phone without video recording/reproducing capability 1.

As shown in FIGS. 1 to 5, for a call between a cellular phone without video recording/reproducing capability and a portable video-phone, not video phone call but voice call has been implemented. A video-phone call may be implemented by deploying a service center cooperating with street cameras and displays, which service center converts video data and voice data to a video-phone format to send to a video-phone terminal, and separates video data from the stream to display on the display device on the street.

Now referring to FIGS. 6 to 8, a second preferred embodiment of the present invention will be described.

Figure 6:
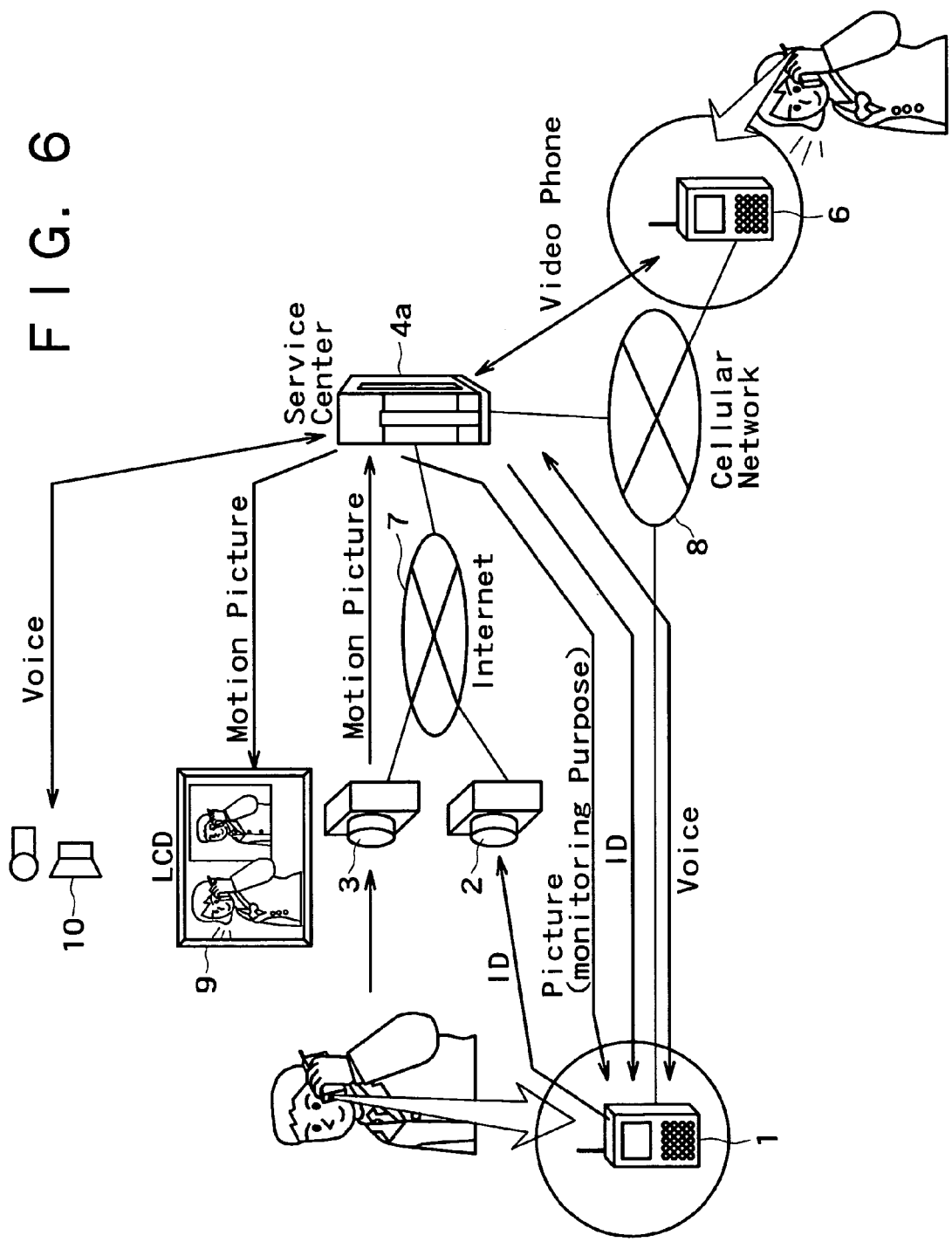
FIG. 6 is a schematic diagram of a telephone communication system in accordance with a second preferred embodiment of the present invention.

In FIG. 6, reference numeral 10 is designated to a microphonerophone and a speaker on the street, 4*b* to a service center.

For the sake of clarity, only the difference from the embodiment shown in FIG. 1 will be described in greater details. In this second preferred embodiment, from the beginning of a voice call to the reproduce/display of video data on the display device 9 will have the same steps as those of the first preferred embodiment. The voice data separated at the service center 4*b* will be sent through the cellular phone network 8 to the cellular phone without video recording/reproducing capability 1 to reproduce thereon, and the same voice data will be simultaneously sent to and reproduced on the microphone and speaker 10. At this time on the cellular phone without video recording/reproducing capability 1 a button is displayed for terminating the voice call session on the cellular phone network 8. Pressing down a key corresponding to this button may cause the service center 4*b* to disconnect the session through the cellular phone network 8 to the cellular phone without video recording/reproducing capability 1, then the cellular phone without video recording/reproducing capability 1 will be disconnected at the same time. The service center 4*b* will actuate the microphone input of the microphone and speaker 10 on the street or enable the microphone input, and will combine it with video data from the camera 3 on the street in lieu of the voice data obtained from the cellular phone without video recording/reproducing capability 1 then convert to the video-phone format to send to the portable video-phone 6. The user having called with the cellular phone without video recording/reproducing capability 1 may continue his/her session by the video-phone by speaking to the display device 9 on the street or the microphone and speaker 10.

In FIG. 7 reference numeral 112 is designated to a button.

For the sake of clarity, only the difference from FIG. 2 showing a first preferred embodiment will be described. In FIG. 7, the steps from presenting an ID of the user to verifying the display contents that the camera position is correct and the user himself/herself is imaged and to notifying the service center 4*b* of the verification are the same as the first embodiment. Thereafter, when starting a video-phone session the service center will instruct cellular phone without video recording/reproducing capability 1 to display a button 112, to promote terminating the voice call session through the cellular phone network 8. When the user presses the button 112, the service center 4*b* will be notified of pressing down the button, the service center 4*b* will override the session between the cellular phone without video recording/reproducing capability 1 and the portable video-phone 6, disconnect the cellular phone without video recording/reproducing capability 1 from the cellular phone network 8, move the session to the video-phone one through the display device 9, camera 3, and microphone and speaker 10.

Figure 8:
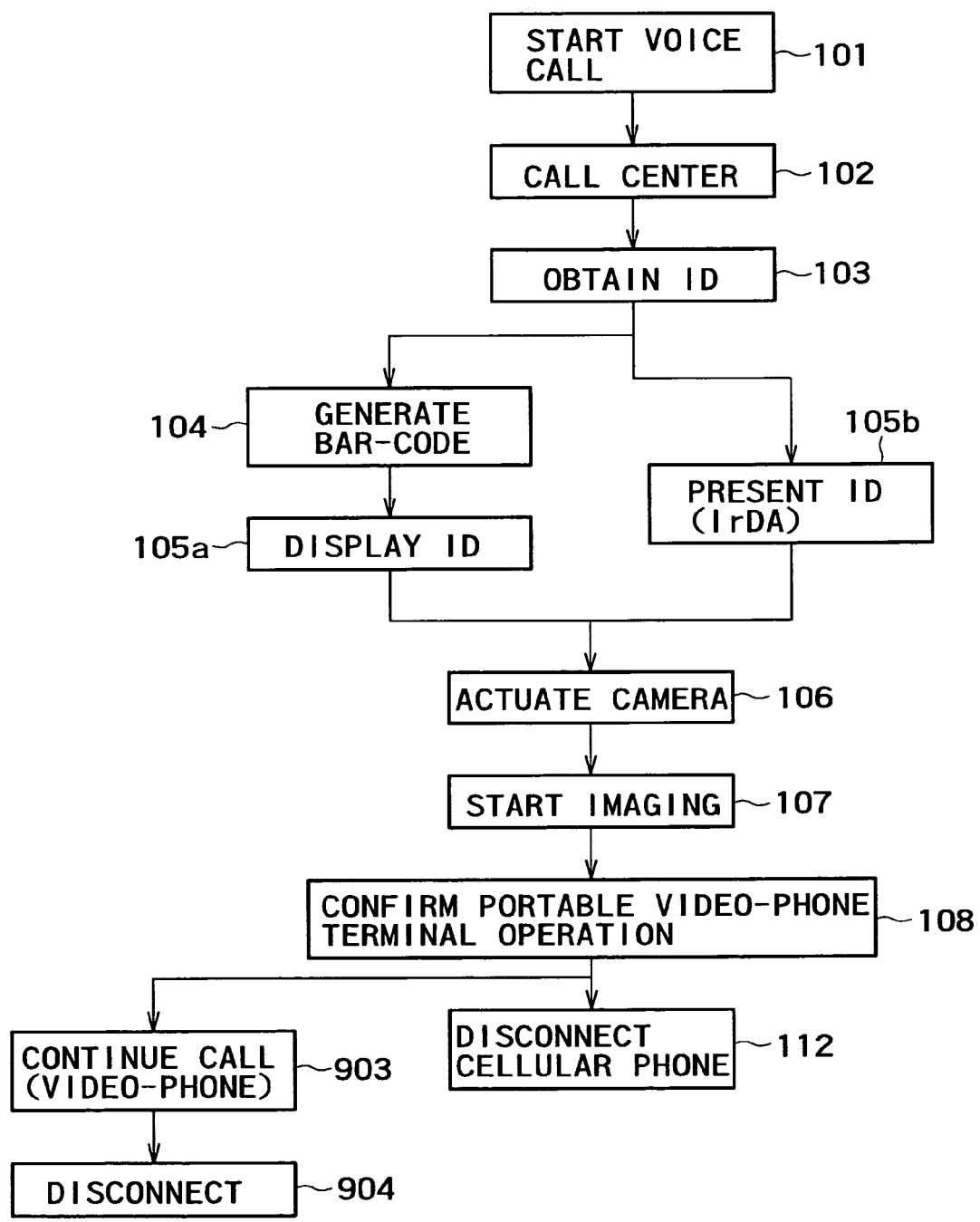
FIG. 8 is a flow diagram of sequential operation of the system embodying the second preferred embodiment.

Referring to FIG. 8, the operational flow of the inventive system will be described. For the sake of clarity, only the difference from FIG. 3 showing a first preferred embodiment will be described. As shown in FIG. 8, the procedure from the step of starting voice call session 101 to the step of verifying the operation of public communication terminal 108 may be the same, and at this point of time data in the video-phone format sent from the portable video-phone 6 will be separated at the service center 4*b*, the video will be displayed on the display device 9, the voice will be reproduced on the cellular phone without video recording/reproducing capability 1. The voice data will also be reproduced from the microphone and speaker 10 on the street.

The service center 4*b* will prompt the cellular phone without video recording/reproducing capability 1 to terminate the voice call session through the cellular phone network 8. If the user agrees, the service center 4*b* will override the session between the cellular phone without video recording/reproducing capability 1 and the portable video-phone 6, and disconnect the cellular phone without video recording/reproducing capability 1 from the cellular phone network 8 at the step of disconnecting cellular phone 112.

Simultaneously as the step of continuing the session 903, the session will be continued as a video-phone session through the display device 9 on the street, camera 3 on the street, and microphone and speaker 10 on the street. When the user hangs up the call the session will be terminated at the step of disconnection 904.

Figure 11:
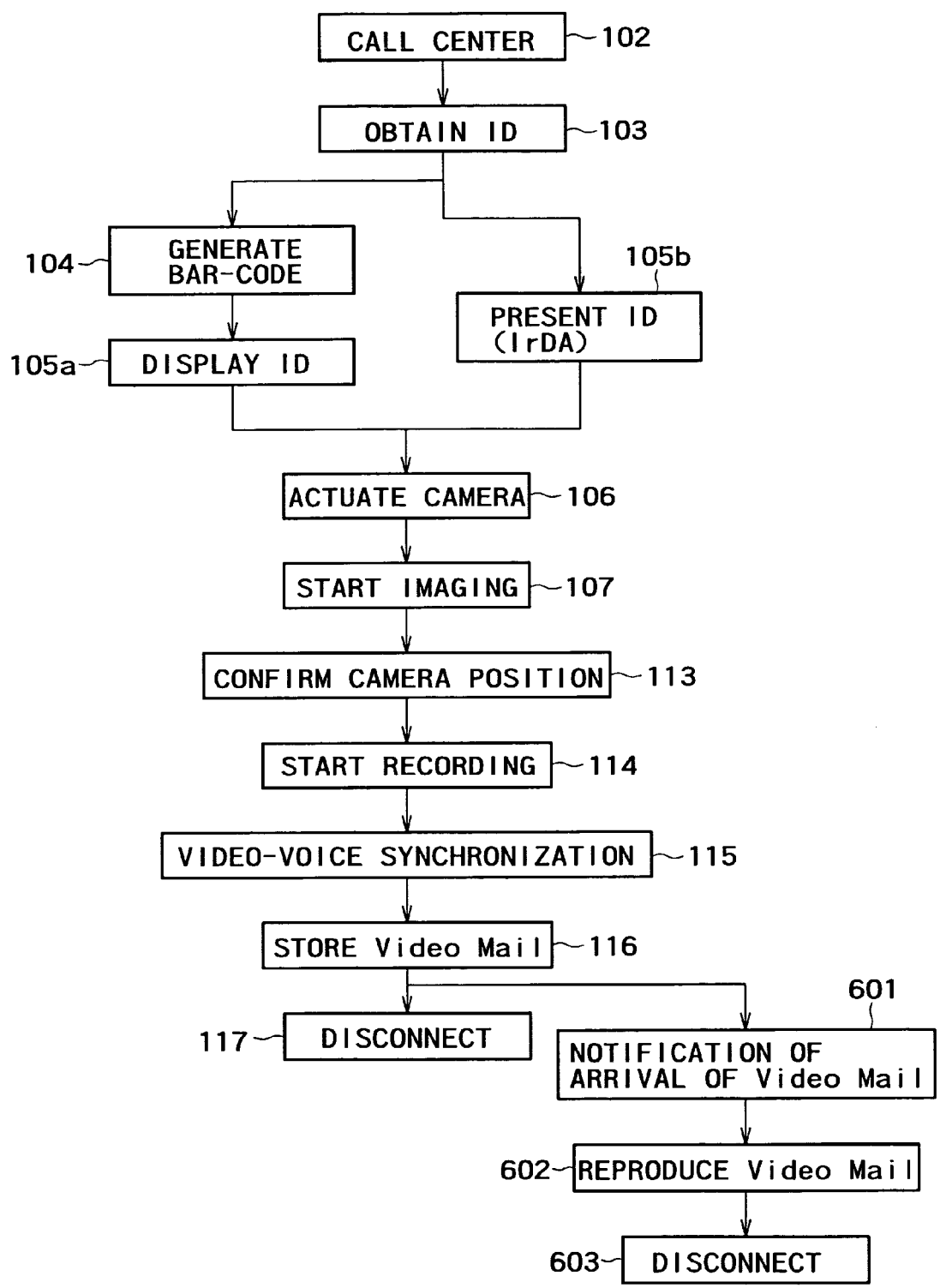
FIG. 11 is a flow diagram of sequential operation of the system embodying the third preferred embodiment.

Next, a third preferred embodiment of the present invention will be described with reference to FIGS. 9 to 11.

Figure 9:
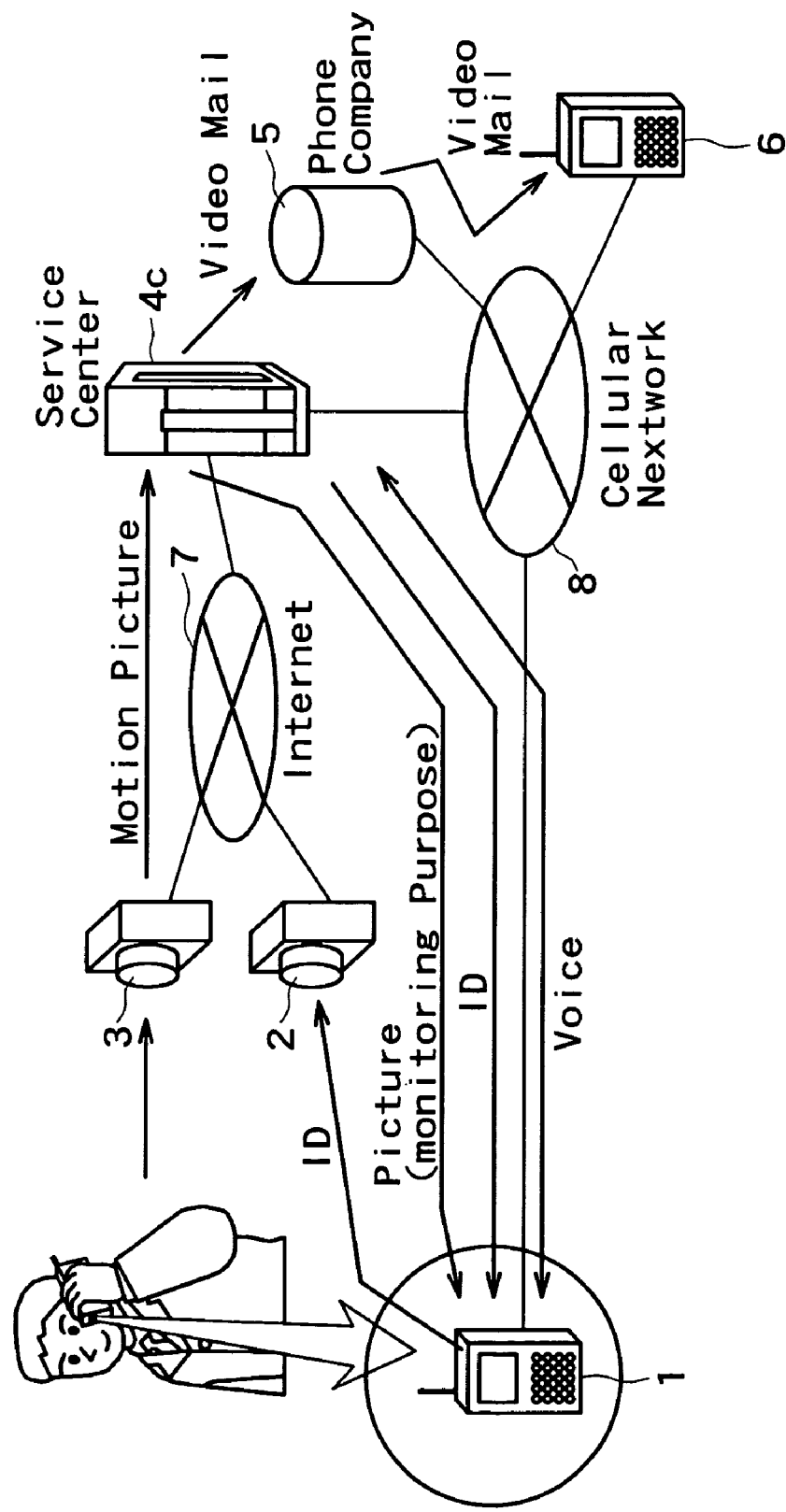
FIG. 9 is a schematic diagram of a telephone communication system in accordance with a third preferred embodiment of the present invention.

In FIG. 9, reference numeral 5 is designated to a video mail server having storage capability, and 4*c* to a service center.

In FIG. 9, a user calls the service center 4*c* from the cellular phone without video recording/reproducing capability 1 to follow the verbal guidance, or launches a menu display, web browser, or Java (trademark) application on the cellular phone to select a menu item to request the use of video mail. In response to the request, an ID required for the use will be obtained. The ID may be consisted of alpha-numerical code or binary code such as for example the phone number of the user, date and time, the identification number allocated to the on-call session between two cellular phones, billing charge code or suffix or subclass of charge code, so as to facilitate the processing at the service center 4*a*. The ID may be sent as a bit-mapped image data by generating a bar-code at the service center 4*c* instead of sending directly to the cellular phone.

An automatic ID generation based on a unique phone number or terminal-specific number stored on the SIM card in the cellular phone without video recording/reproducing capability 1, or based on a combination of such a number with the date and time, unique identification number of the connected base station of the cellular phone network 8, may simplify the ID request to the service center 4*c*.

The requested ID will be displayed on the display screen as a bar-code on the cellular phone without video recording/reproducing capability 1. When presenting the cellular phone without video recording/reproducing capability 1 to the sensor or camera 2 on the street, which sensor or camera 2 scans the display screen and decodes the ID to inform the service center 4*c*.

In this preferred embodiment, the sensor or camera on the street may be a conventional CCD or CMOS sensor or camera, which will scan in the visible light range. Since a CCD and CMOS sensor or camera may receive infrared (IR) light by blocking the visible light, an ID may be presented via an infrared communication by means of an IrDA Infrared Data Communication Port of the cellular phone.

The service center 4*c* after having verified the validity of the presented ID, will actuate the camera 3 on the street to start image capturing. Captured images may be in the format of still images such as JPEG or GIF to be sent to the cellular phone without video recording/reproducing capability 1 to display thereon. The user will verify based on the displayed image that the camera position is correct and the user himself/herself is captured and will notify the service center 4*c* of the verification, and simultaneously call the service center 4*c*, which in turn start voice recording. In addition, the service center 4*c* may call back the cellular phone without video recording/reproducing capability 1 and the voice recording may be started when the user hangs off.

The service center 4*c* will receive the video data from the camera 3 on the street, convolve it with the voice data recording in progress, and convert to the video-phone data format to send to the video mail server 5. When business finishes, and the voice call from the user is terminated, the voice recording stops, and at the time when the video-phone format data including the last voice data is sent, the video mail server 5 will be informed of the termination of transmission. The service center will stop the operation of camera 3 simultaneously. The video mail server 5 will store thus received video data and voice data in the video-phone format.

The video mail server 5 will notify the portable video-phone 6 of the arrival of a video mail. The portable video-phone 6 will appropriately call up the video mail server 5 to reproduce the mail or download the mail to reproduce it later.

In FIG. 10 reference numeral 114 and 116 designate to buttons.

When the user presents an ID the two dimensional bar-code 11 will be displayed on the display screen of the terminal. The bar-code may also be one dimensional bar-code or a bit-mapped data. The user after presented a bar-code will press a key on the cellular phone without video recording/reproducing capability 1 corresponding to the button 106 to terminate the bar-code display.

The service center 4*c* after having verified the validity of the ID presented will actuate the camera 3 on the street, and captured image will be sent to the cellular phone without video recording/reproducing capability 1 in a still image format so as to display as a still image 12 of the user captured by the street camera. The user will confirm the contents of the still image that the camera position is correct and the user himself/herself is imaged, then will press a key on the cellular phone without video recording/reproducing capability 1 corresponding to the button 114 for voice recording to notify the service center 4*c*.

When pressing the button 114, the cellular phone without video recording/reproducing capability 1 will call the telephone number of the service center 4*c*, which number is also allocated to the button 114. When connected the user will follow the guidance to start voice recording, and when business is finished pressing a key of the cellular phone without video recording/reproducing capability 1 corresponding to the button 116 will hang up the call, the service center 4*c* in turn will stop recording at the time the call is terminated and the transmission of a video mail will be completed.

Now referring to FIG. 11, the operational flow of the inventive system will be described. As shown in FIG. 11, the user of the cellular phone without video recording/reproducing capability 1, after calling up the center 102, will attempt to obtain an ID 103 and will obtain an ID. The ID may be presented via IrDA 105*b*, or displayed on the display screen of the cellular phone without video recording/reproducing capability 1 in the ID display 105*a* after bar-code generation 104 to present to the sensor or camera 2.

The service center 4*c* after having verified the validity of the ID presented will actuate the camera 106 on the street, start capturing 107, and obtain an image captured by the camera 3. Captured image will be sent to the cellular phone without video recording/reproducing capability 1 in a still image format to prompt user the verification of camera position 113 and the user will confirm. Simultaneously the cellular phone without video recording/reproducing capability 1 will call up the service center 4*c*, the user will follow the verbal guidance to start recording 114 when connected, and the service center 4*c* will perform video-voice synchronization process 115 to receive video data from the camera 3, convolve it with the recording voice data to convert to the video-phone data format to send to the video mail server 5. The video mail server 5 in turn will store thus received data at video mail storage 116 and wait for termination, and complete the storage at disconnection 117.

After completed, the video mail server 5 will notify the portable video-phone 6 of the arrival of a video mail at video mail arrival notification 601. The portable video-phone 6 then will connect to the video mail server 5 appropriately to reproduce the mail or download to reproduce it later at video mail playback 602. When playback or download completes, the portable video-phone 6 disconnect the video mail server 5 at the disconnection 603.

Now referring to FIG. 12, a fourth preferred embodiment will be described.

Figure 12:
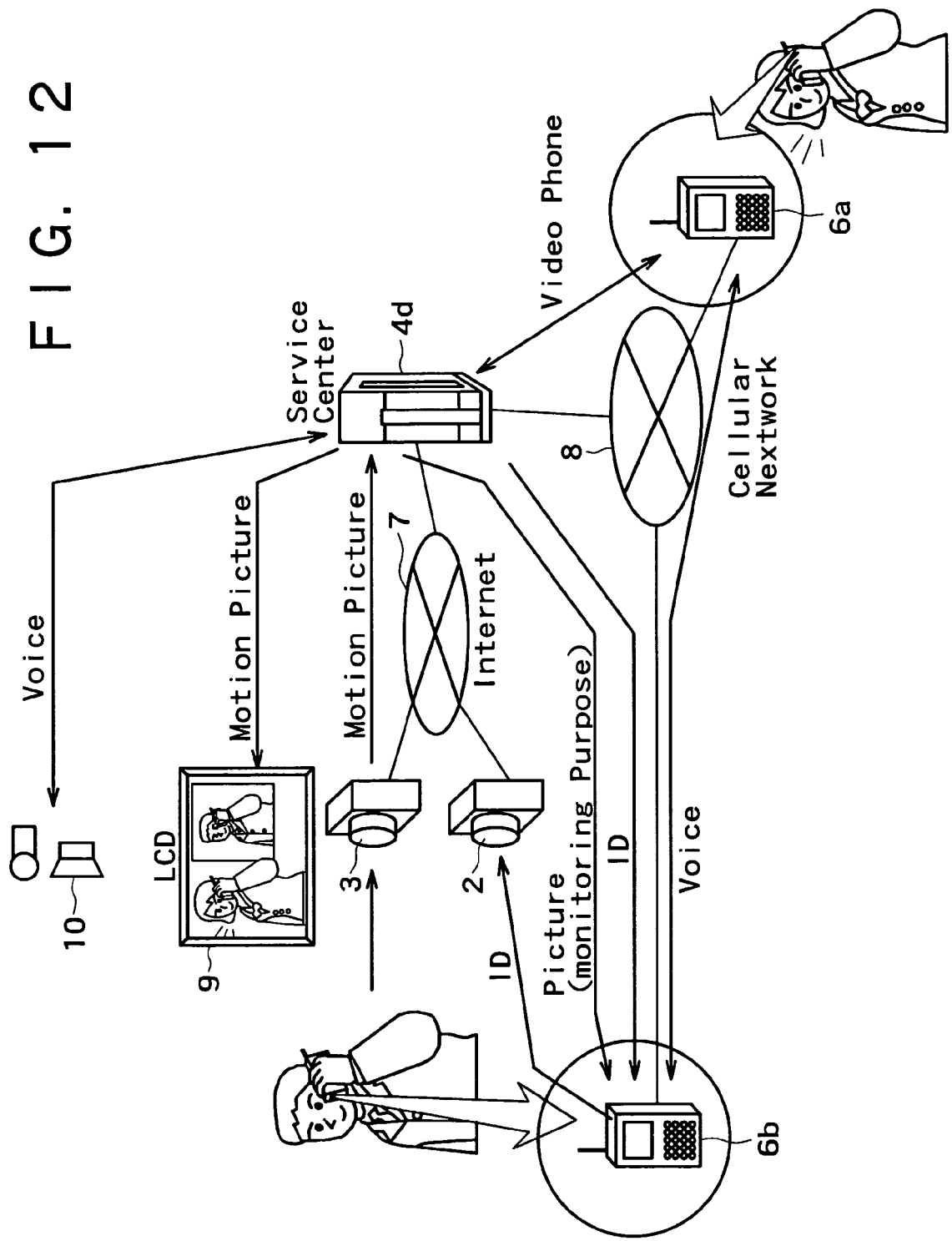
FIG. 12 is a schematic diagram of a telephone communication system in accordance with a fourth preferred embodiment of the present invention.
Figure 13:
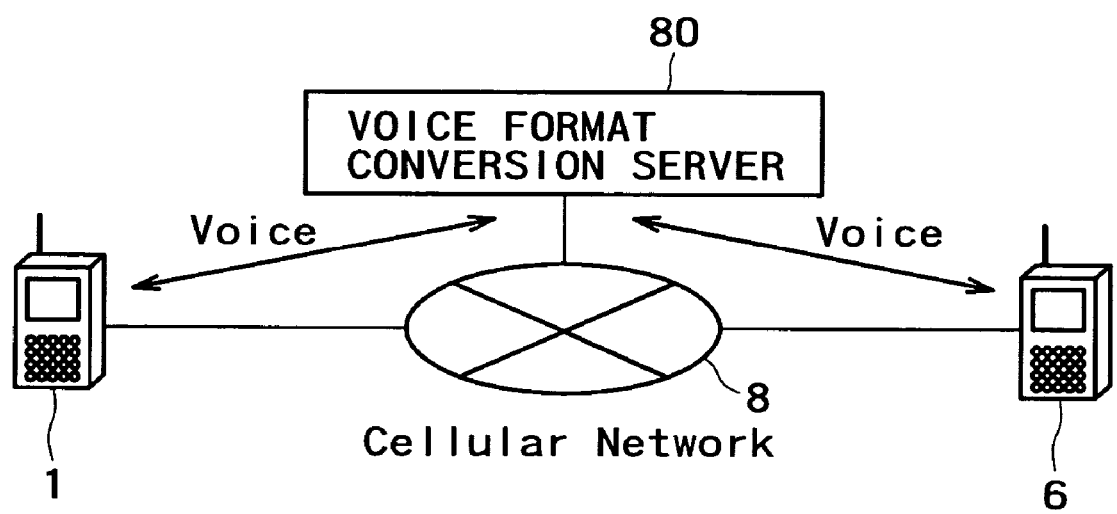
FIG. 13 is a schematic diagram of a conventional telephone system of the Prior Art.

In FIG. 12, reference numeral 4*d* is designated to a service center, 6*a* and 6*b* to portable video-phones.

For the sake of clarity, difference from FIG. 6 showing a second preferred embodiment will be depicted. In this fourth preferred embodiment, the portable video-phone 6*a* and portable video-phone 6*b* communicates as video-phone from the beginning. The call agent in the service center 4*d* during the call will perform call control to manage the communication status but will not perform any media conversion.

When the user of the portable video-phone 6*a* desires to switch the call from the portable video-phone 6*a* to the public communication terminal composed of the camera 3 on the street, display device 9 on the street and microphone and speaker 10 on the street, the user will call up the service center 4*d* to request an ID for having video-phone service by means of a public communication terminal, and obtain an ID. The steps from the presentation of an ID using the portable video-phone 6*b* and the sensor or camera 2 to the verification of the validity of ID at the service center 4*d* will be the same as those shown in first to third preferred embodiments.

The service center 4*d* having verified the validity of presented ID will actuate the camera 3 on the street to start capturing an image. Captured image will be in a still image format such as JPEG or GIF, which will be sent to the portable video-phone 6*a* to display on the display screen.

The user will confirm from the displayed contents that the camera position is correct and the user himself/herself is captured, and notify the service center 4d of the confirmation. In this confirmation step, the service center 4d may collect a plurality of images from a plurality of cameras 3 around or in the vicinity of the user position to sequentially send them to portable video-phone 6a so as to allow the user to select the appropriate one among them in order to decide the camera 3 on the street to be used for the communication.

Since the public communication terminal is ready to use, the service center 4d will direct the portable video-phone 6b to switch the path of video-phone data to the one through a media converter of the service center 4d. When the path switching is successfully performed, the service center will extract data from the video-phone format received from the portable video-phone 6b, voice data to play back from the speaker of the microphone and speaker 10 while the video data to display on the display device 9. In addition, the media converter of the service center 4d may gather the voice data collected from the microphone of the microphone and speaker 10 and the video data collected from the street camera to convert to the video-phone format to send to the portable video-phone 6b to enable a video-phone session with the portable video-phone 6b.

At the time of switching the connection path, the portable video-phone 6a will be disconnected from the cellular phone network 8.

During a video-phone session sing the public communication terminal, if the user desires a continuous call from the portable video-phone 6a to portable video-phone 6b, then the user will call up the service center 4d from the portable video-phone 6a to request call switching. The call agent in the service center 4d will control the media converter on call to cause switching from the video-phone session between the media converter and the portable video-phone 6b to the session between the portable video-phone 6a and portable video-phone 6b.

When switched, the service center 4d will release the media converter and the public communication terminal.

Now referring to FIGS. 14 to 18, a fifth preferred embodiment will be described.

Figure 14:
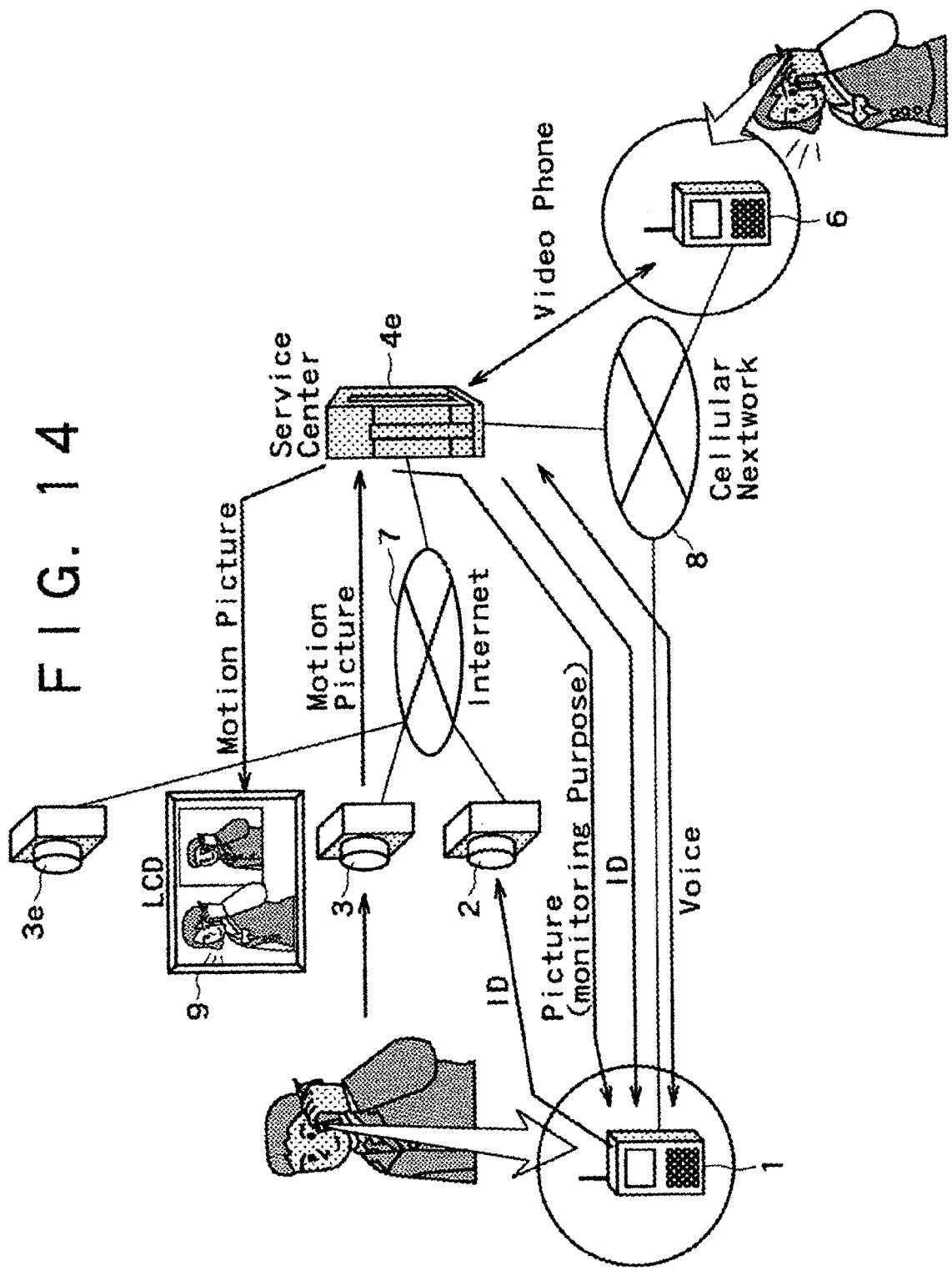
FIG. 14 is a schematic diagram of a telephone communication system in accordance with a fifth preferred embodiment of the present invention.

In FIG. 14, reference numeral 3e designates to a street camera, and 4e to a service center.

In FIG. 15, reference numeral 12a is designated to no camera input, 12b to an image from the camera 3, 12c to an image from the camera 3e, 12d to an image from a camera placed nearby, 120 to an icon for call back a previous image, 121 to an icon for selection/execution, 122 to an icon for call back a next image.

Figure 17:
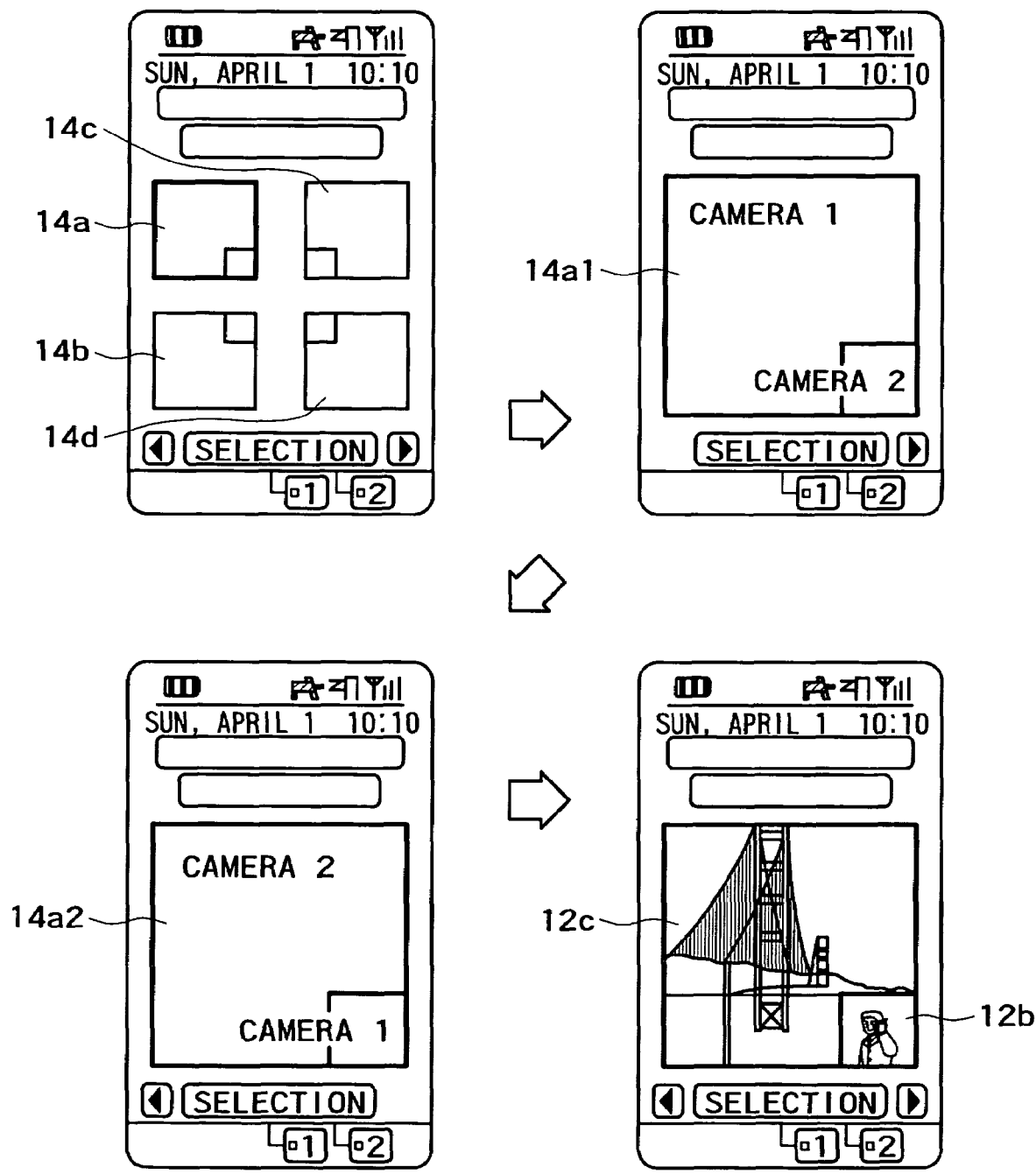
FIG. 17 is a schematic diagram illustrating display layout selection in the fifth preferred embodiment.

In FIG. 17, reference numerals 14a, 14b, 14c, 14d are icons indicating image layout, 14a1 is an icon of image layout for allocating the image of camera 1 on the main display, 14a2 is an icon of image layout for allocating the image of camera 2 on the main display.

For the sake of clarity, the difference from FIG. 1 showing the first preferred embodiment will be described.

In a fifth preferred embodiment, the user will start communicating from cellular phone without video recording/reproducing capability 1 to the portable video-phone 6 through the cellular phone network 8. Thereafter, process steps to the verification of the validity of ID presented to the service center 4e.

The service center 4e will actuate the camera 3, camera 3e, and other cameras placed therearound to start capturing. Captured image may be in the format of still images such as JPEG or GIF to be sent to the cellular phone without video recording/reproducing capability 1 to display thereon.

On the display screen of the cellular phone without video recording/reproducing capability 1, as shown in FIG. 15, captured image 12b of the camera 3 and another captured image 12c of the camera 3e are displayed. The user may select any given two of them by pressing a button or a key (a button hereinafter) correspondingly allocated to the selection icon 121.

Figure 16:
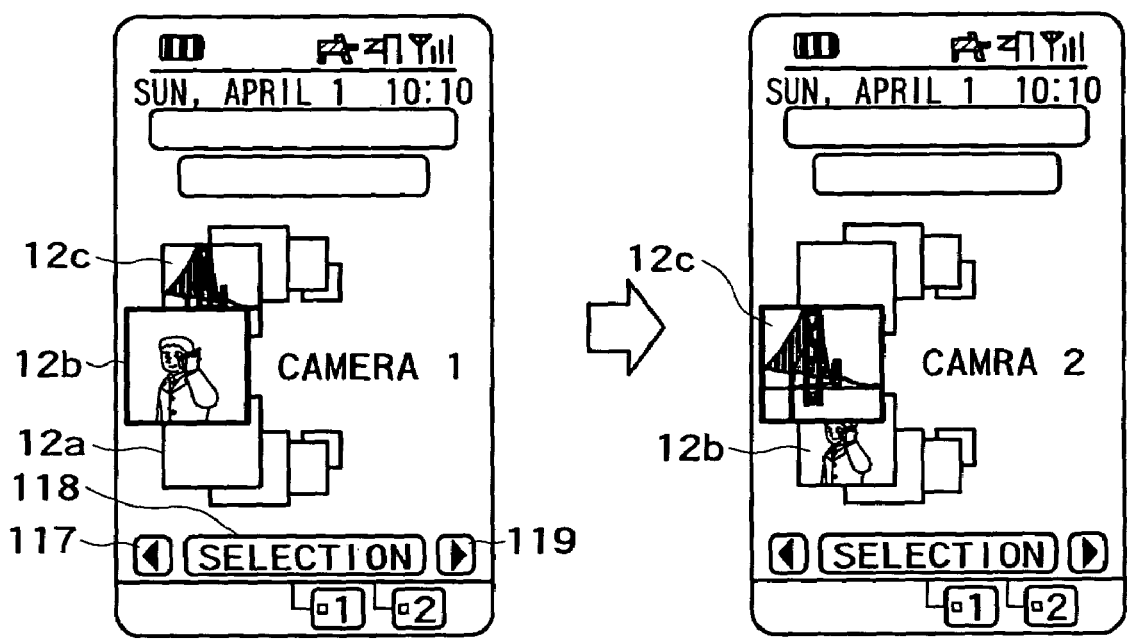
FIG. 16 is a schematic diagram illustrating camera selection in the fifth preferred embodiment.

The image to be selected in FIG. 15 may be scrolled horizontally by pressing a button corresponding to the icon 120 and icon 122. The cellular phone without video recording/reproducing capability 1 may also scroll display vertically or endless scroll as shown in FIG. 16 by changing the display setting.

When selected, by selecting icons 14a, 14b, 14c, 14d indicating the image layout shown in FIG. 17 the size and position of two images may be selected. When selecting the icon 14a, image layout icon 14a1 will be displayed for allocating the image of camera 1 to the main display, and when selecting this layout, the image from the camera 3 will be displayed on the main display and the image from the camera 3e will be positioned on the wipe screen.

By pressing a button corresponding to the icon 120 or 122, display will be changed to the icon 14a2 indicating display layout, so that the image from camera 2 will be placed on the main display. The image from the camera 3e will be displayed on the main display and the image from the camera 3 will be in the wipe screen.

The cellular phone 1 may hold the setting of layout. After selecting image in accordance with FIG. 15 or 16, the icon 14a1 indicating that the image from the camera 1 may be placed on the main display can be displayed. By pressing a button corresponding to the icons 120 and 122, the display can be switched to the icon 14a2 indicating that the image from the camera 2 may be placed on the main display.

Also, since the cellular phone 1 may hold the setting of layout, it may display the image from the camera 3 and the image from the camera 3e in accordance with the display layout setting, without displaying the icon 14a1, and by pressing a button corresponding to the icons 120 and 122, the size of images may be swapped.

The information about thus selected layout will be sent to the service center 4e. The images from the cameras 3, 3e on the street will be composed at the service center 4e in accordance with the layout, to transfer to the called portable video-phone 6 as MPEG-4 streaming data.

FIG. 18 shows the format of transferred MPEG-4 streaming data and the attribute values of the display area attribute.

The service center 4e will send to the portable video-phone 6 the attribute values of the display area attribute, followed by the streaming data of MPEG-4 starting with the conventional MPEG-4 header.

The MPEG-4 streaming data which follows the attribute values of the display area attribute may be either in the program stream format or transport stream format. The streaming data may be generated either in a program stream in which the images from the camera 3 and the camera 3e, are image-composed as bit-mapped images and then encoded or in a transport stream in which each of images is encoded and then composed.

When the transmission stream data is in transport stream format, the stream data may be provided with attribute values, including and not limited to, primary video overlay inhibition, primary video priority reproduce, wipe screen priority reproduce, primary video to wipe screen switching inhibition, wipe screen display/non-display switching inhibition, wipe screen border coordinates, and overlay inhibition that inhibits wipe screen display at the camera of receiving terminal. On the receiving terminal video data will be displayed in accordance with the attribute values of the display area attribute.

When the transmission streaming data is in program stream format, the stream data may be provided with attribute values, including and not limited to, primary video overlay inhibition, wipe screen border coordinates, and overlay inhibition that inhibits wipe screen display at the camera of receiving terminal. On the receiving terminal video data will be displayed in accordance with the attribute values of the display area attribute.

Now referring to FIGS. 19 to 25, a sixth preferred embodiment of the present invention will be described in greater details.

Figure 19:
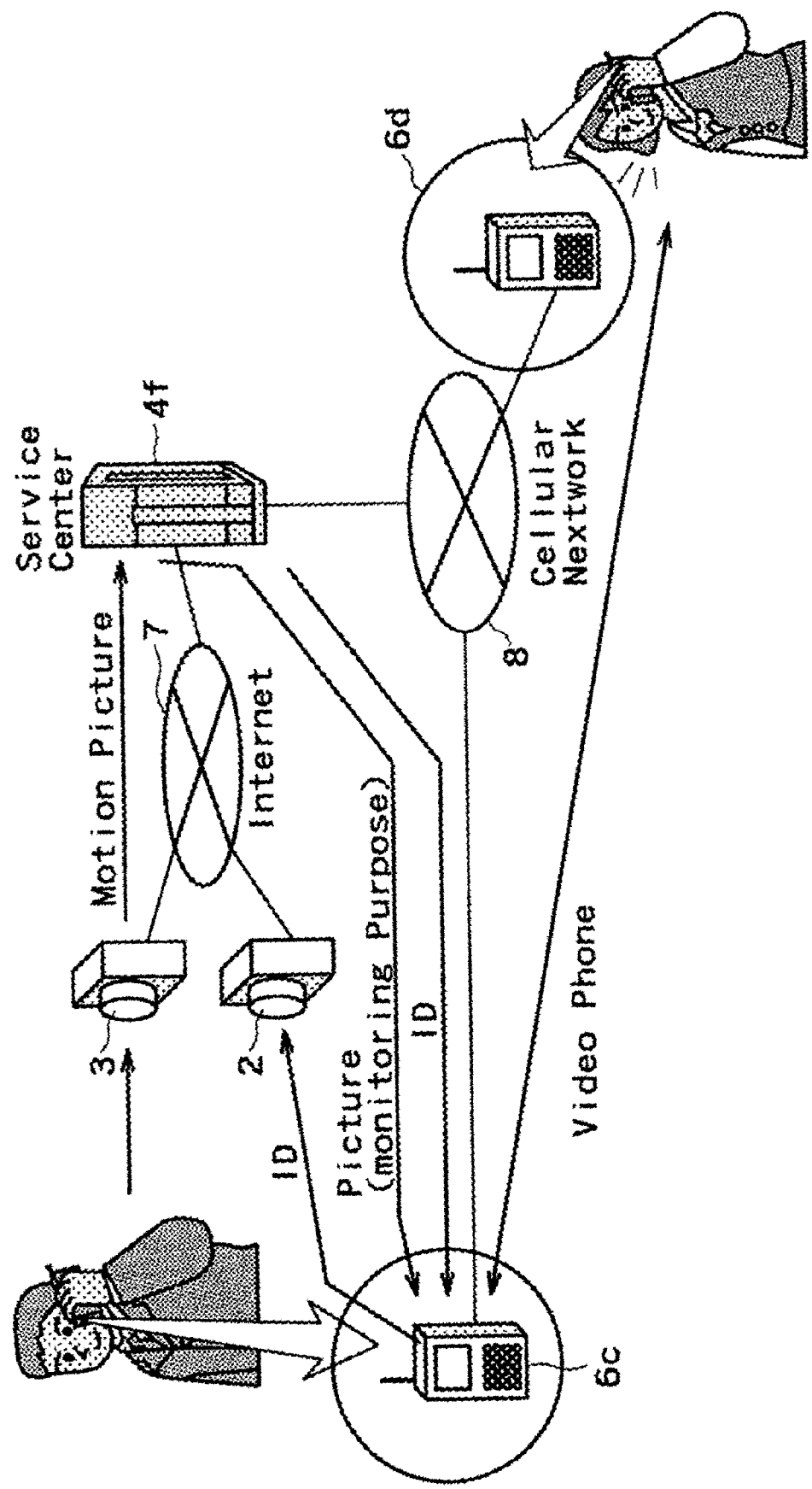
FIG. 19 is a schematic diagram of a telephone communication system in accordance with a sixth preferred embodiment of the present invention.

In FIG. 19 reference numeral 4*f* is designated to a service center, 6*c*, 6*d* are portable video-phone terminals.

Figure 20:
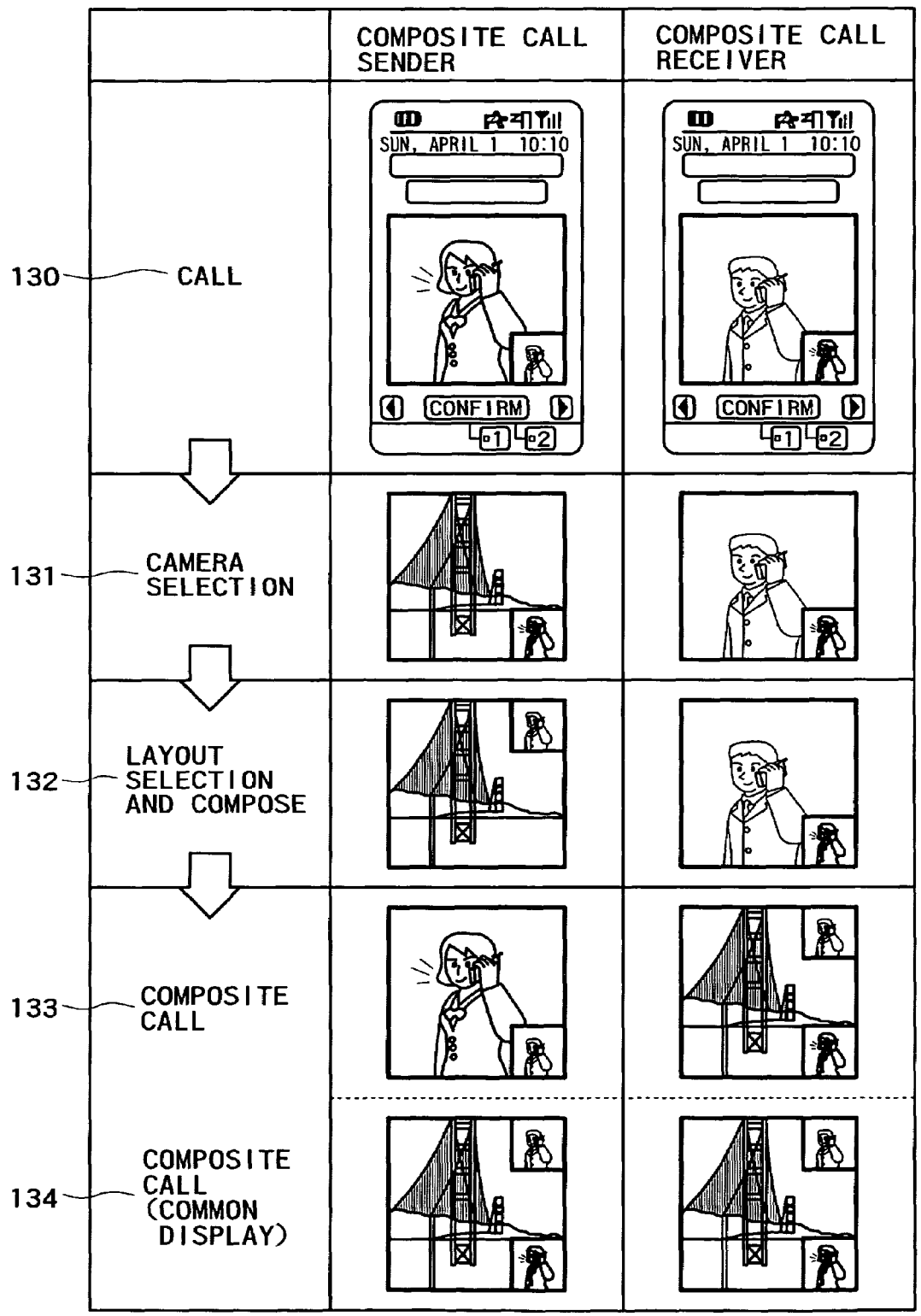
FIG. 20 is a schematic diagram illustrating switching over to a composite call session in the sixth preferred embodiment.

In FIG. 20 reference numeral 130 is designated to video display of 6*c* and 6*d* on call, 131 to video display of 6*c* and 6*d* in camera selection mode, 132 to video display of 6*c* and 6*d* in layout selection mode, 133 to video display of 6*c* and 6*d* in composite session in progress, and 134 to video display of 6*c* and 6*d* in composite session in progress (common display).

Figure 21:
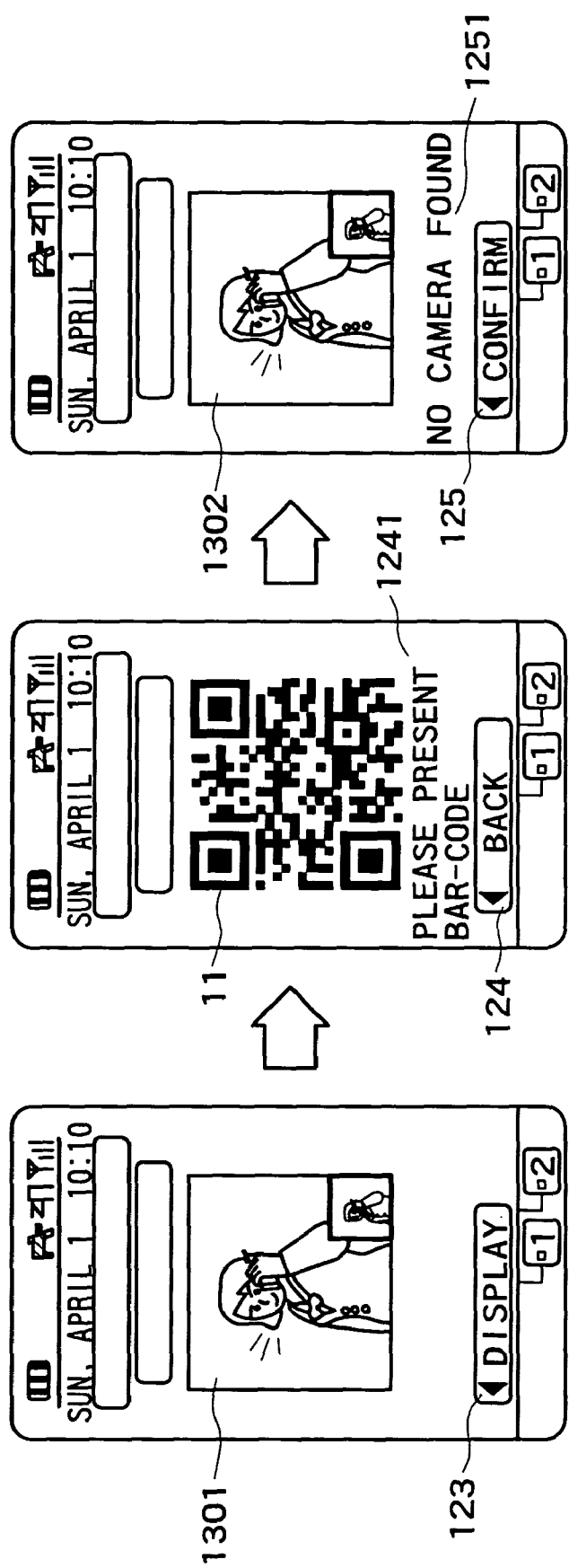
FIG. 21 is a schematic diagram illustrating the application of a composite call session in the sixth preferred embodiment.

In FIG. 21, reference numerals 1301, 1302 is designated to video display of 6*c* on call, 123 to an icon for presenting an application bar-code of a composite call, 124 to an icon for terminating the bar-code display to return to on-call status, 1241, 1251 to status display, 125 to an icon for the user to press a corresponding button when confirming the status display 1251 (this function is referred to as "clue" function).

In FIG. 19, a video-phone session is carried on between the portable video-phones 6*c* and 6*d* (on call status 130).

When the user of FIG. 21 depresses a button corresponding to the icon 123 for presenting an application bar-code of a composite call of portable video-phone 6*c*, the portable video-phone 6*c* will generate or download a bar-code 11 including a caller ID of the on call status 130 to display on the screen.

By presenting this bar-code 11 to the sensor or camera 2 the user may indicate a caller ID to the service center 4*f*. After presentation, the user presses a button or a key corresponding to the icon 124 for terminating the bar-code 11 display and returning to the on-call status to terminate the bar-code display and the display screen of the portable video-phone 6*c* will return to the video-phone on call status display.

While the portable video-phone 6*c* is presenting a bar-code 11, the video-phone call session between the portable video-phone 6*c* and portable video-phone 6*d* may be held, video and voice data between portable video-phone 6*c* and portable video-phone 6*d* will be communicated. For the video data the portable video-phone 6*c* will display no video and discard the video data. Also, the portable video-phone 6*c*, when presenting a bar-code 11, will iteratively send the captured data at the time when the button or key corresponding to the icon 123 is depressed, to allow the portable video-phone 6*d* to display a still image.

In addition, still display on the portable video-phone 6*d* may be performed by sending a still command or video data with still display attribute (referred to as still attribute).

In FIG. 19, the service center 4*f* will indicate a caller ID included in the bar-code 11 to the cellular phone network to request a copy of packets of the video-phone session between the portable video-phones 6*c* and 6*d*. The cellular phone network will verify the validity of the caller ID then transfer a copy of packets of video-phone session between the portable video-phones 6*c* and 6*d* to the service center 4*f*, while at the same time the video-phone session between portable video-phones 6*c* and 6*d* will be held through the cellular phone network.

As shown in FIG. 21, the service center 4*f* having been presented will find a camera 3 placed around the sensor or camera 2 on the street that the user presented the bar-code including his caller ID, indicate the presence or absence of the camera 3 available to the portable video-phone 6*c*, and indicate the status display 1251 on the portable video-phone 6*c*. When the user will depress a button or a key corresponding to the icon 125, the portable video-phone 6*c* will return to the usual video-phone session (on call status 130) if no camera 3 on the street is available, or transit to the camera select (camera selection status 131) if one or more camera 3 is available.

Figure 22:
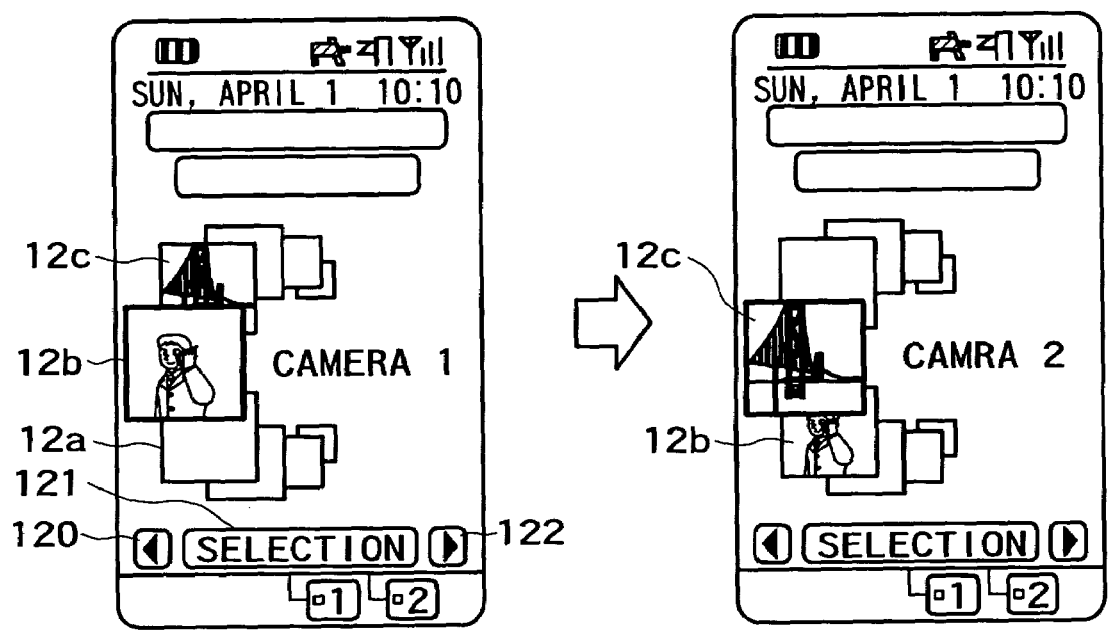
FIG. 22 is a schematic diagram illustrating camera selection in the sixth preferred embodiment.
Figure 23:
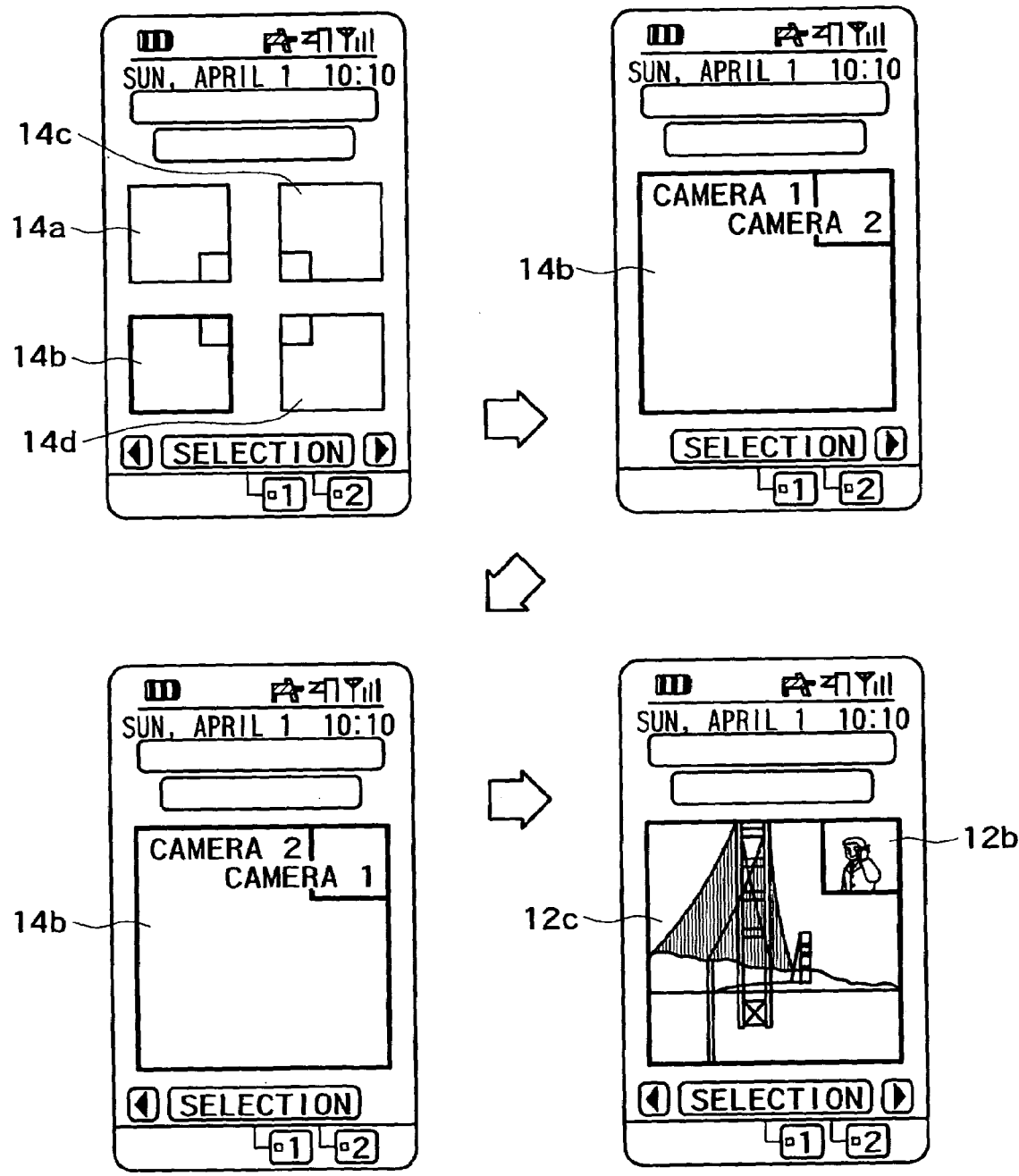
FIG. 23 is a schematic diagram illustrating display layout selection in the sixth preferred embodiment.

FIGS. 22 and 23 show the camera selection and display layout in accordance with a sixth preferred embodiment.

When transiting to the camera selection status 131, the service center 4*f* will actuate the camera 3 therearound to start capturing. Captured image will be sent to the portable video-phone 6*c* to display thereon. The service center 4*f* may also convert thus captured images to a still image format such as JPEG and GIF to send to the portable video-phone 6*c* to display thereon.

On the display screen of the portable video-phone 6*c*, as shown in FIG. 22, the image 12*b* captured by the camera of the portable video-phone 6*c* and the image 12*c* captured by the camera 3 on the street will be both displayed, and the user may select either one of two by depressing a button or a key correspondingly allocated to the selection icon 121. The images to be selected in FIG. 22 may be horizontally scrolled by depressing a button or a key corresponding to the icon 120 and icon 122.

Once selected, the size and position of two images may be selected by choosing one of icons 14*a*, 14*b*, 14*c*, 14*d* indicating the image display layout shown in FIG. 23 (layout selection and composition status 132). When selecting the icon 14*b* indicative of a display layout, an icon 14*b*1 will be displayed, indicating a layout that the captured image of camera 1 is placed in the main display, and when selecting this layout, the captured image of the camera of the portable video-phone 6*c* will be placed in the main display, and the image captured by the camera 3 on the street will be placed in the wipe screen.

By manipulating buttons corresponding to the icons 120, 122, an icon 14*b*2 will be displayed indicating another image layout that the captured image from the camera 2 will be placed in the main display. The captured image of camera 3 will be placed in the main display and the captured image of camera of portable video-phone 6*c* in the wipe screen.

The portable video-phone 6*c* may hold the layout setting, so that after having selected a captured image in FIG. 22, the icon 14*b*1 can be displayed indicating the layout that the image captured by the camera 1 will be placed in the main display. By manipulating the buttons corresponding to the icons 120 and 122, the icon can also be switched to the icon 14*b*2 indicative of the layout that the image captured by the camera 2 will be placed in the main display.

Next, referring to FIGS. 24 and 25, encoding, composing, and decoding processes in the portable video-phone 6*c*, 6*d* and service center 4*f* in accordance with the sixth preferred embodiment will be described in greater details.

Figure 24:
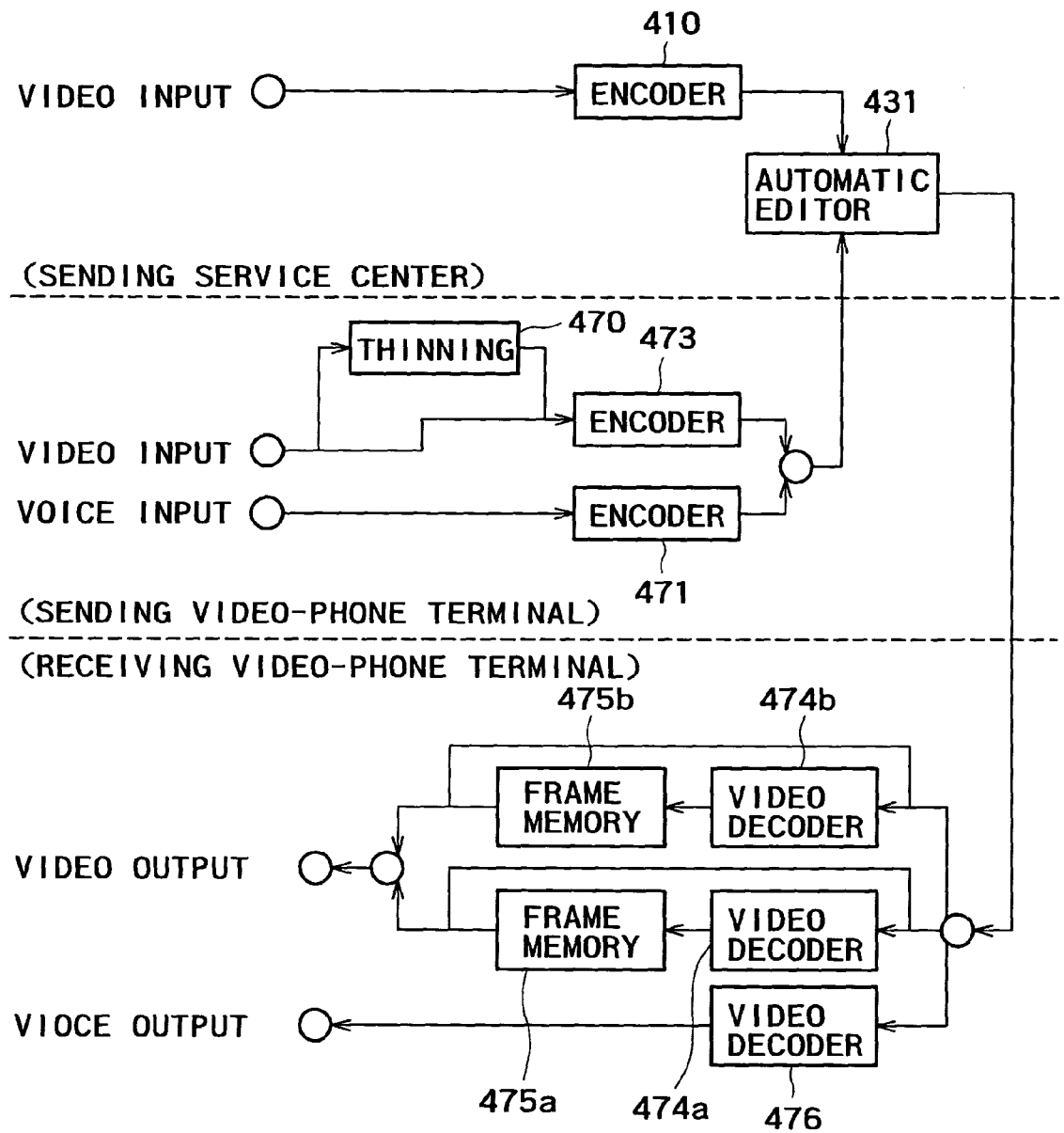
FIG. 24 is a flow diagram illustrating encoding, composing and decoding processes in a portable video-phone terminal and a service center in accordance with the six preferred embodiment.

In FIG. 24, reference numeral 410 is designated to an encoder of the service center 4*f*, 431 to an automatic editor of the service center 4*f*, 470 to the thinning function of the portable video-phone 6*c*, 471 to a video encoder of the portable video-phone 6*c*, 473 to a voice encoder of the portable video-phone 6*c*, 474*a* and 474*b* to video encoders of the portable video-phone 6*d*, 475*a* and 475*b* to a frame memory of the portable video-phone 6*d*, and 476 to a voice decoder of the portable video-phone 6*d*.

The service center 4*f* shown in FIG. 19 may transmit video data in the transport stream format to the portable video-phone 6*d*, or the service center 4*f* may compose video data from the video data derived from the portable video-phone 6*c* and video data from the camera 3 on the street to transmit video data in the program stream format to the portable video-phone 6*d*.

In FIG. 24, the encoder 410 will encode every frames of the video data captured by the camera 3 on the street to input to the automatic editor 431.

The portable video-phone 6c will encode the video data captured by the camera built in the portable video-phone 6c by the video encoder 471, voice data by the voice encoder 473, respectively, to convert data into the portable video-phone format and transmit to the cellular phone network.

The cellular phone network will relay a copy of data in this portable video-phone format to the service center 4f to input to the automatic editor 431 of the service center 4f. When the user allocates the video captured by the portable video-phone 6c to the wipe screen in the layout selection, the data to be input to the video encoder 471 will be thinned prior to input to the encoder by the thin function 470 to adjust the size to the wipe screen.

For the data from the portable video-phone 6c in the portable video-phone format, the automatic editor 431 of the service center 4f will replace the video data with the input from the encoder 410, in case in which the wipe screen is placed in the image captured by the portable video-phone 6c in accordance with the video image layout.

The automatic editor of the service center 4f will output data in the transport stream format, with the data in the portable video-phone format interlaced to the video data for the wipe screen, and will transmit to the portable video-phone 6d through the cellular phone network.

The portable video-phone 6d upon receipt of data in this transport stream format will decode data in the portable video-phone format by means of the video decoder 474a and voice decoder 476, and stores video data in the frame memory 574a. The video data for the wipe screen will be decoded by the video decoder 474b and then stored in the frame memory 574b. The display device of the portable video-phone 6d will read out data from the frame memories 574a and 574b for display.

The automatic editor 431 of the service center 4f will operate on the quantize coefficient for encoding in accordance with the image layout to fit the bit rate to the rate allowed for the portable video-phone (bit rate limit: indicating quantize coefficient).

For a layout that the main display displays data captured by the portable video-phone 6c, quantize coefficient should be slightly decreased by one or two, and the encoding with this value will be indicated to the portable video-phone 6c. This value may also be written into the portable video-phone 6c as factory setting used for the default value of the composite encoding.

With the quantize coefficient being instructed, the upper limit of the bit rate occupied by the main display screen will be determined and the automatic editor 431 of the service center 4f will indicate to the encoder 410 the remaining bit rate calculated from the upper limit of the bit rate of the voice data defined in the video-phone format. In this manner, the service center 4f may fit the bit rate of data to be sent to the portable video-phone 6d in the transport stream format into the tolerant range.

For a layout that the wipe screen displays data captured by the portable video-phone 6c, the automatic editor 431 of the service center 4f will instruct the encoder 410 to set the remaining bit rate or quantize coefficient that can be derived from the bit rate occupied by the wipe screen and the upper limit of the voice bit rate defined in the video-phone format to a slightly decreased value from the default by one or two. In this manner, the service center 4f may fit into the tolerant range the bit rate of transport stream format data to be sent to the portable video-phone 6d. When the size of wipe screen increases and relative area with respect to the main display becomes larger, the portable video-phone 6c will be instructed to encode with the quantize coefficient slightly decreased by one or two from the default value.

(Inhibition of Moving Vector to the Wipe Screen Area)

(Insertion and Composition Based on Macro Block Unit)

Figure 25:
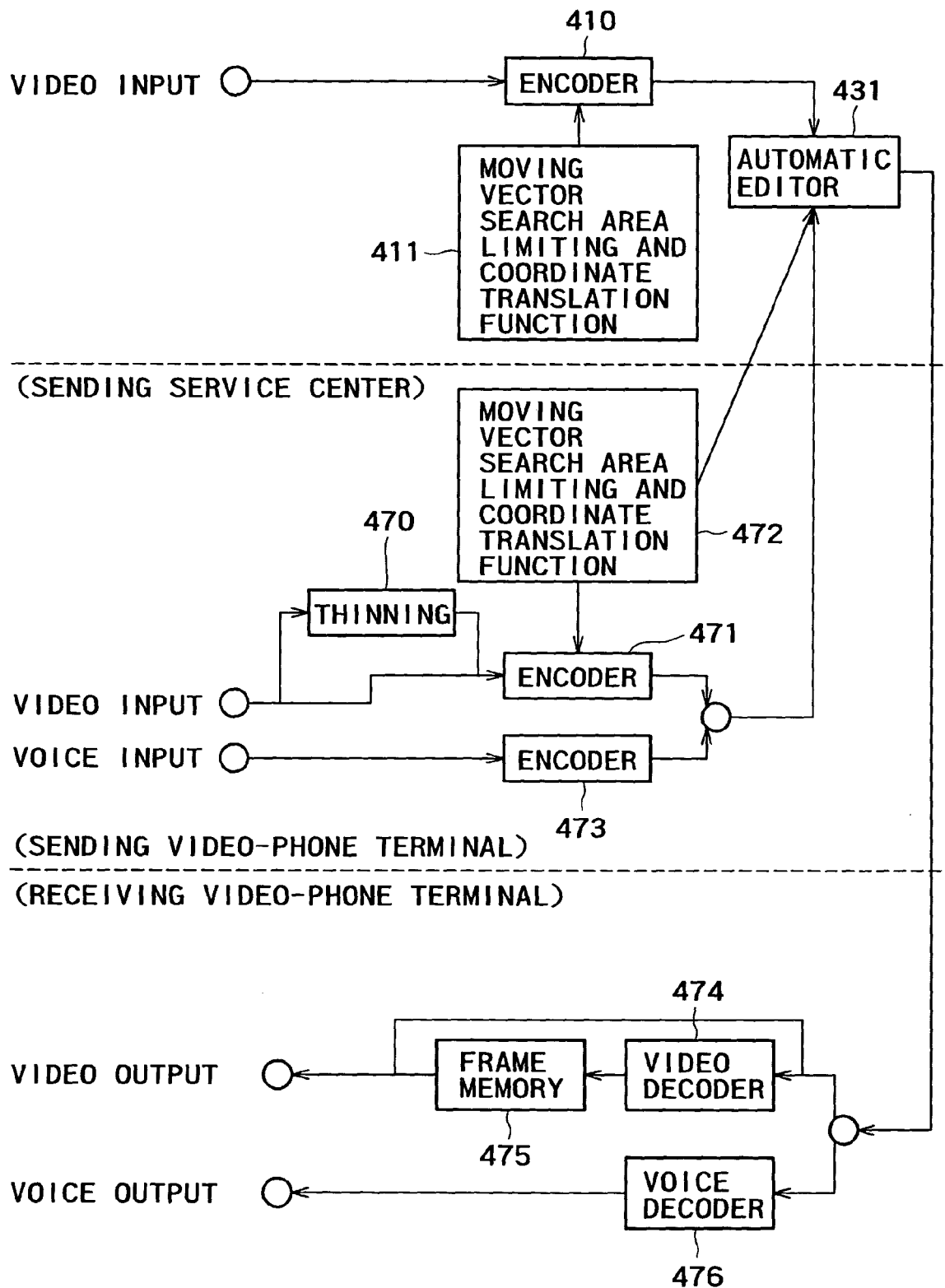
FIG. 25 is a flow diagram illustrating encoding, composing and decoding processes in a portable video-phone terminal and a service center in accordance with the six preferred embodiment.

In FIG. 25, reference numeral 411 is designated to a function of limiting search area of moving vector and coordinate translation of the service center 4f, 432 to an automatic editor of the service center 4f, 472 to a function of limiting search area of moving vector and coordinate translation of the portable video-phone 6c, 474 to a video encoder of the portable video-phone 6d, and 475 to a frame memory of the portable video-phone 6d.

The encoder 410 will input data captured by the camera 3 on the street to the automatic editor 432. The portable video-phone 6c will encode the data captured by the camera built in the portable video-phone 6c by the video encoder 471, voice data by the voice encoder 473, respectively, to convert to data in the portable video-phone format to transmit on the cellular phone network. The cellular phone network will relay a copy of data in the portable video-phone format to the service center 4f to be input into the automatic editor 432 of the service center 4f.

When the user allocates the video captured by the portable video-phone 6c to the wipe screen, the video derived from the camera 3 on the street will be displayed on the main display, and all display area except for the area occupied by the wipe screen will be encoded to input to the automatic editor 431. In this case, based on the direction by the moving vector search area limiting and coordinate translation function 411, encoding without searching moving vector in the area fitted by the wipe screen allows outputting video data which will not reference the restricted area.

The video captured by the portable video-phone 6c will be thinned by the thin function 470 to adjust the size thereof to that of wipe screen prior to input to the video encoder 471 for encoding. At the same time moving vectors will be encoded, by translating the coordinate system of the wipe screen to the coordinate system of the main display into which the wipe screen will be fitted by means of the moving vector search area limiting and coordinate translation function 472. Encoded video data will be processed to data in the portable video-phone format, along with the data encoded by the voice encoder 473 to send over the cellular phone network. The automatic editor 432 of the service center 4f will receive a copy of data in the portable video-phone format from the cellular phone network to extract therefrom video data. Video data may be managed in macro-block basis so as to appropriately insert as a macro-block into the video data of main display at the position where the wipe screen is to be placed. Once inserted, video data matching with the display size of the portable video-phone terminal or with the display size of the main display of the portable video-phone 6d is completed.

The service center 4f will process thus completed video data into the portable video-phone format to output over the cellular phone network to send to the portable video-phone 6d.

When the user allocates the video captured by the portable video-phone 6c to the main display in the display layout step, the video from the camera 3 will be on the main display, thus any area except for the area occupied by the wipe screen will be encoded and input into the automatic editor 431. In this case the encoder 410 will thin data captured by the camera 3 on the street to adjust the size to fit to the wipe screen prior to encoding. Simultaneously, for moving vector, moving vector search area limiting and coordinate translation function 411 will encode the coordinate system of the wipe screen to the coordinate system of the main display to which the wipe screen will be embedded.

For the video captured by the portable video-phone 6c, video encoder 471 will follow the instruction given by the moving vector search area limiting and coordinate translation function 472 to encode without searching moving vector in the area where the wipe screen will be embedded. In this manner video data which will not reference the restricted area will be output.

Encoded video data will be processed by combining with the data encoded by the voice encoder 473 into the portable video-phone format data so as to transmit to the cellular phone network. The automatic editor 432 of the service center 4f will receive a copy of portable video-phone format data from the cellular phone network to extract video data. The automatic editor 432 of the service center 4f will read each macro-block of video data at a time, and when data reaches to the point where the wipe screen should be inserted, the editor will insert data output from the encoder 410 appropriately a macro-block at a time. Once inserted, video data which may pertain to the screen size of either the portable video-phone format or of the main display of the portable video-phone 6d will be completed.

The service center 4f will reformat thus completed video data into the portable video-phone format to output to the cellular phone network in order to transmit to the portable video-phone 6d.

In either cases in which the video captured by the portable video-phone 6c will be displayed in the main display or in the wipe screen, the portable video-phone 6d will extract the video and voice data from the received portable video-phone format data. The voice data will be decoded by the voice decoder 476 to play back, while the video data will be decoded by the video decoder 474 to output to the frame memory 475 for displaying.

(Bit Rate Limitation: Indicating Quantize Coefficient)

For a layout that the data captured by the portable video-phone 6c is placed in the main display, the automatic editor 432 of the service center 4f will reference to the quantize coefficient of the video data of the portable video-phone format data sent from the portable video-phone 6c in order to indicate the quantize coefficient to the encoder 410.

If the bit rate of the portable video-phone format data sent to the portable video-phone 6d exceeds to the maximum value, the automatic editor 432 will slightly decrease the quantize coefficient value by one or two to indicate encoding with this value to the portable video-phone 6c, in order to fit the bit rate within the tolerant range.

For a layout that the data captured by the portable video-phone 6c is placed in the wipe screen, the automatic editor 432 of the service center 4f will direct the encoder 410 to slightly decrease the remaining bit rate calculated from the bit rate used by the wipe screen and the upper limit of the voice bit rate defined in the video-phone format, or the quantize coefficient from the default value, by one or two. In this manner, the service center 4f will fit the bit rate of the portable video-phone format data to be sent to the portable video-phone 6d into the tolerant value. If the size of wipe screen increases and relative area with respect to the main display becomes larger, then the portable video-phone 6c will be instructed to encode with the quantize coefficient slightly decreased by one or two from the default value.

Next, FIG. 26 shows a seventh preferred embodiment.

In FIG. 26, reference numeral 140 is designated to a conventional portable video-phone call session, 141 to a composite session, 142 to a composite session using an external display device, 143 to a portable video-phone call session using an external camera and external display device.

The calls between two portable video-phone terminals may be either voice only session or video-phone session, and both terminals may communicate through the cellular phone network (140).

When transiting from the video-phone session to the composite call session, a copy of voice and video packets from the portable video-phone will be sent to the service center. The service center will compose the voice and video packets with the video captured by the street camera to send to the called portable video-phone (141). Since the voice data is sent through the service center, the temporal delay between the video display and the voice production will be minimized even when the user's face for example user's lips is displayed in the video.

After starting a composite session, the called party may select using an external display device. The video composed in the service center will be sent through a path such as the Internet, other than the cellular phone network to display on an external display device at the vicinity of the portable video-phone terminal (142). By sending voice data via the service center, the temporal delay between the video display and the voice production will be minimized even when the user's face for example user's lips is displayed in the video.

The user may use a display device in the vicinity during the composite session. In this case, since the user may capture himself/herself with the street camera, and the video-phone session can be continued with an external display device, the user may close up an object other than the user with the portable video-phone terminal, or may image the inside interspace by inserting hand-held video-phone terminal into an interspace.

Alternatively a composite call session may be stopped by turning off the camera of the portable video-phone terminal (143). Therefore the user may hold a video-phone terminal over his/her ear in the home and use a wide screen of television for the video-phone.

In the composition at the service center, using a video stream encoded by restricting the reference to moving vectors, another video stream may be readily embedded into the video stream.

By providing a translating mechanism for translating the coordinate system of the other video stream to embed into the coordinate system of the video stream to be embedded, any conventional decoder may reproduce the stream.

Also, indicating or controlling quantize coefficient for encoding one of embedding streams based on the quantize coefficient of the other stream allows controlling the bit rate of composed stream, resulting in transport within a predetermined bandwidth as well as reproducing with any conventional decoder.

In addition, turning off the camera of the portable video-phone terminal to stop a composite call session allows the user to use a wide screen of television for the video-phone, while holding a video-phone terminal over his/her ear in the home.

It should be noted that although in the above preferred embodiments, cameras and display devices are placed on the street for public communication terminals, these devices may be placed not only on the street but also in an office or in a home.

In accordance with above preferred embodiments, cellular phones having not video-phone service provided may be used along with cameras and display devices to allow to communicate with a portable video-phone terminal by video-phone. This may extend the life of conventional cellular phones.

The operating rate of cameras on the street and display devices on the street as well as the usage of cellular phone network will be improved. By changing the communication path from a cellular phone to a communication terminal including cameras, display devices, and speakers and microphones, some frequencies and base station resources, which are resources of cellular phone network used for calls by cellular phones may be released, allowing alleviating the crowd of cellular phone network to avoid traffic congestion.

By changing terminals from at least one of portable video-phone terminals to a public communication terminal, the number of objects in the vicinity captured in the video data will be increased to enrich the flow of transmissible information.

By changing a call to a public communication terminal, the consumption of battery of a portable video-phone terminal that has short continuous call time will be decreased, and the continuous call time and standby duration will be elongated.

In addition to the items according to any one of claims, further aspects of the present invention may be as follows:

(1) In a communication method according to claim 5, the identifier will be converted to an image data by a call agent or a second cellular phone terminal, which second cellular phone terminal may display the converted image data on its display screen, and the detector will read this display to decode the identifier.

(2) In a communication method according to claim 5, the detector of identifier is a sensor or a scanner, which has accuracy of 7 to 12 pixels or more than 12 pixels per 1 millimeter for reading an identifier.

(3) In a communication method according to claim 5, the detector of identifier will be an imaging device, which has a field depth from 1 to 30 centimeters to infinity, and has accuracy of 7 to 12 pixels or more than 12 pixels per 1 millimeter for reading an identifier, in part or all of the field depth.

(4) In a communication method according to claim 10, one of buttons of the second cellular phone terminal is operatively allocated to image data creation, for converting an identifier to image data to display when the user presses this button.

(5) In a system according to claim 16, one of buttons of the first cellular phone terminal is operatively allocated to identifier request, for requesting an identifier to a call agent when the user presses this button.

(6) In a system according to claim 16, one of buttons of the first cellular phone terminal is operatively allocated to image data creation, for requesting an identifier to a call agent and for converting a received identifier to create image data when the user presses this button.

(7) In a system according to claim 16, one of buttons of the first cellular phone terminal is operatively allocated to image data creation, for requesting image data obtained by converting an identifier to a call agent, and for displaying thus received image data on the display screen of the first phone terminal when the user presses this button.

(8) In a method according to claim 6, including an identifier to be read and decoded by a second cellular phone terminal and to be displayed on a public communication terminal, one of buttons of the second cellular phone terminal is allocated to reading, and for the procedure steps of reading, decoding and sending to a call agent, either only first or first to second or all of procedure steps may be processed when the user presses this button.

(9) In claim 19, further including a gateway and cellular phone network having received reply-packets, the gateway transmits received packets to the other portable video-phone terminal on the cellular phone network, while at the same time a call agent or a cellular phone network discards a copy of packets transmitted by a portable video-phone terminal to another portable video-phone terminal at the time when the copy of the packets is transferred to a service center.

(10) For the identifier (ID) to be displayed on a portable video-phone terminal, any one or a combination of any one or both phone numbers of portable video-phone terminals, terminal ID, any one or both IDs of connected base stations, channel number used, slot number used, billing information, may be used.

(11) The above mentioned ID may be displayed by the blink of visible light or infrared light.

(12) The above mentioned ID may be displayed as a bitmap image consisted of for example a bar-code created by one of portable video-phone terminal based on the operation of a button on a portable video-phone terminal.

(13) One of buttons on the one of portable video-phone terminal is allocated to termination of a composite call, for sending a notification of termination of a composite call by the user pressing this button, presenting to the photoreceptor (detector) placed on the street, or indicating the termination of a composite call to a service center and a call agent through the cellular phone network to stop copying and discarding packets.

(14) A method of composing a stream consisted of voice and video with a video stream, in which the number of pixels is different between a video frame of the stream of voice and video and a video frame of the video stream, the smaller one is embedded to the larger one for outputting a composite stream of voice and video.

(15) In a method of composing of (14), the area of the larger frame into which the smaller frame is to be embedded is on the macro-block unit basis.

(16) In a method of composing of (14), the encoder for encoding the smaller frame to be embedded includes a converter means for converting the macro-block number and moving vector reference block number of video stream of the smaller frame size into the coordinate system of the area of the larger frame to embed.

(17) In a method of composing of (14), the encoder for encoding the video of the smaller frame size to be embedded indicates a quantize coefficient to the encoder for encoding the video of larger frame size to improve either one better than the other of the image quality of embedded smaller frame or the image quality of embedding larger frame of the voice and video stream being output from the composite service of the voice and video stream with the video stream.

(18) In a method of composing of (14), the video stream is extracted from another stream consisted of video and voice.

(19) In a method of composing of (14), the composition is consisted of adding display attribute information and then outputting.

(20) In a method of composing of (14), further including a decoder for reproducing the stream with display attribute information added, and a display device for displaying in accordance with the display attribute information.

(21) In a composing method according to claim 26, embedding position is specified when a decoder is embedding a smaller frame video into a larger frame video to display.

(22) In a composing method of (21), the decoder and display device are inhibited and suppressed to display an independent video other than the transport stream in the area of the larger and smaller frames.

(23) In a composing method of (21), the decoder and display device are specified with the position to display an independent video other than the transport stream in the area of the larger and smaller frames.

(24) In a composing method of (21), the decoder and display device are specified to still display either one display of the larger or smaller frames or both.

(25) In a composing method of (21), in the decoder and display device the larger frame and smaller frame may have different update frequency or appearance frequency or frame rate.

(26) In a composing method of (21), the larger frame and smaller frame may output a transport stream of different update frequency or appearance frequency or frame rate.

(27) In a telephone communication system according to claim 14, the call agent charges the calling terminal of the originating voice call session for all call times.

In accordance with the present invention, a video-phone call is achieved between a cellular phone terminal and a portable video-phone terminal by making use of such communication terminal devices as cameras and display devices.

What is claimed is:

1. A telephone communication system, for establishing communication between a first telephone terminal and a second telephone terminal, through a communication network, comprising:

the first telephone terminal having functions of voice and data communication, video capturing, compression/expansion of captured video and displaying;

the second telephone terminal not having at least one of the functions of capturing video, compression/expansion of captured video, and displaying video;

a service center connected to the communication network, having a call agent for call control to a called telephone terminal, and for assigning an identifier to the second telephone terminal, and a media converter for converting image data and voice data;

a public communication terminal connected to the service center and having a display function;

wherein the service center:

performs call control through the call agent between the first and second telephone terminals, communicates to the first telephone terminal in a format including video data and voice data via the media converter, sends video data to the public communication terminal relating to the second telephone terminal via the media converter, sends voice data to the second telephone terminal via the media converter, and determines the public communication terminal relating to the second telephone terminal for each communication based on the identifier assigned to the second terminal by the call agent.

2. A telephone communication system according to claim 1, wherein:

the public communication terminal includes a display device and an imaging device;

the call agent is configured to detect a request for using the public communication terminal sent from the second telephone terminal;

the call agent, when detecting a request from the second telephone terminal, actuates the display device and the imaging device, and the media converter directs transmission and reception of video data; and the call agent directs the first telephone terminal to transition to a video-phone call session, the media converter releases the connection to the second telephone terminal, in order to perform a video-phone call session between the public communication terminal and the first telephone terminal.

3. A telephone communication system according to claim 1, further including a server having a storage connected to the communication network, wherein:

the call agent is configured to detect a request or using the public communication terminal sent from the second telephone terminal;

the call agent, when detecting a request from the telephone terminal, actuates the public communication terminal to direct the media converter to transmit and receive video data;

the media converter composes voice data from the second telephone terminal with the video data to send to the server;

the call agent indicates the destination and directs the server to store the video data; and the server notifies the first telephone terminal of the arrival of video data, and the first telephone terminal in response to the notification obtains video data stored in the server to display thereon.

4. A communication method for providing voice calls between a first telephone terminal and a second telephone terminal, through a communication network, comprising the steps of:

providing a service center connected to the communication network, having a call agent for call control to a called telephone terminal and a media converter for converting image data and voice data;

providing a public communication terminal connected to the service center and having a display device and an imaging device;

establishing communication between a first telephone terminal and the media converter in a format comprised of video data and voice data, wherein the first telephone terminal includes functions of voice communication, video capturing, compression/expansion of captured video, and displaying video;

recognizing a request for using the public communication terminal sent from a second telephone terminal which has a voice communication function but not at least one of video capturing, compression/expansion of captured video, and displaying video;

assigning an identifier to the second telephone terminal under control by the call agent;

determining the public communication terminal relating to the second telephone terminal for each communication based on the identifier assigned to the second telephone terminal by the call agent; and transmitting and receiving video data by the media converter, when the request has been validated, by actuating the display device or the video capturing device of the public communication terminal corresponding to the second telephone terminal.

5. A communication method according to claim 4, further comprising the steps of:

adding an identifier to the second telephone terminal, under the control of the call agent, in response to the request from the second telephone terminal;

displaying any related information about the identifier on the second telephone terminal;

detecting the displayed identifier on the second telephone terminal by a detector included in the public communication terminal to send to the service center the detected information; and enabling the use of the public communication terminal in the vicinity of the second telephone terminal in order to transmit and receive video data by the call agent in accordance with the information included in the received identifier.

6. A communication method according to claim 4, further comprising the steps of:

displaying an identifier assigned to the public communication terminal on the display device of the public communication terminal;

reading and decoding, by the second telephone terminal, the identifier of the public communication terminal to send to the call agent; and granting permission to use the public communication terminal indicated by the identifier to the second telephone terminal by the call agent.

7. A communication method according to claim 6, further including the steps of:

requesting video data to a plurality of the public communication terminals when allowing the use of the plurality of the public communication terminals;

extracting a still image from received video data for each of the public communication terminals; and sending images to the second telephone terminal for selection of one still image in order to determine the public communication terminal used for the videophone communication.

8. A communication method according to claim 5, wherein:

one display button of the second telephone terminal is operatively allocated to a request of identifier; and an identifier request is sent to the call agent by the user by operating the display button.

9. A telephone communication system for providing voice calls between a first telephone terminal and a second telephone terminal, through a communication network, comprising:

the first telephone terminal having functions of voice and data communication, video capturing, compression/expansion of captured video and displaying;

the second telephone terminal not having at least one of the functions of capturing video, or compression/expansion of captured video, and displaying video;

a service center connected to the communication network, having a call agent for call control to a called telephone terminal for detection of a request for using the public communication terminal and for assigning an identifier to the second telephone terminal, and a media converter for converting image data and voice data; and a public communication terminal connected to the service center and having an image display device and an image device;

wherein:

the service center determines the public communication terminal relating to the second telephone terminal for each communication based on the identifier assigned by the call agent;

the call agent actuates the public communication terminal to enable video data communication to the media converter and to direct the second telephone terminal to transit to the video-phone call;

the media converter composes voice data from the second telephone terminal with the video data from the public communication terminal to send to the first telephone terminal; and the media converter extracts voice data and video data from the first telephone terminal, extracted voice data is sent to the second telephone terminal, extracted video data is sent to the display device of the public communication terminal.

10. A telephone communication system according to claim 9, wherein:

the media converter compares information of transmission time added to voice data with information of transmission time added to video data to compose voice data with video data of substantially the same time.

11. A telephone communication system according to claim 9, wherein:

the media converter compares clock information included in the media converter with information of transmission time added to voice data and information of transmission time added to video data to determine am amount of delay, and determines transmission time of composed data to the communication network derived from the amount of delay, processing time of the media converter, and spare time predefined in the media converter, to thereby equalize an arrival time at the first telephone terminal.

12. A telephone communication system according to claim 9, wherein:

the media converter composes extracted video data with video data received from the capturing device at the time of completion of extraction, to send to the display device; and the display device displays simultaneously video from the first telephone terminal and video captured by the capturing device.

13. A telephone communication system according to claim 9, wherein:

the call agent identifies a media converter which is in the shortest path to the public communication terminal to switch from the media converter interconnecting the second telephone terminal and the first telephone terminal, prior to use the public communication terminal.

14. A public communication terminal for providing voice calls between a first telephone terminal and a second telephone terminal, through a communication network, comprising:

a service center connected to the communication network, having a call agent for call control to a called telephone terminal and for assigning an identifier to the second telephone terminal, and a media converter for converting image data and voice data;

wherein:

communication is performed in a format including voice data and video data for the first telephone terminal having the functions of voice communication, video capturing, compression/expansion of captured video, and display;

the use of a public communication terminal connected to the service center having a display device and capturing device is enabled, based on a request from a second telephone terminal having a voice communication function but without at least one of the functions of video capturing, compression/expansion of captured video, and displaying;

the service center determines the public communication terminal relating to the second telephone terminal for each communication based on the identifier assigned to the second telephone terminal by the call agent;

the media converter performs transmission and reception of voice data for the second telephone terminal while performing transmission and reception of video data for the display device or capturing device of the public communication terminal; and the call agent charges the second telephone terminal based on the call time of the use of the public communication terminal.

15. A telephone communication system according to claim 14, wherein:

the call agent charges the second telephone terminal based on the balance amount of call time from the voice call.

16. A telephone communication system according to claim 14, wherein:
the call agent and a plurality of media converters are communicable with a plurality of public communication terminals;
when placing a call to a first telephone terminal through a communication network,
the call agent switches the video-phone communication with another first telephone terminal from the one of first telephone terminal to one of the public communication terminal; and
one of public communication terminals performs a video-phone call through the media converter.

17. A telephone communication system according to claim 16, wherein:
the second telephone terminal or the first telephone terminal possessed by the user on video call from a public communication terminal requests the call agent to transition from the public communication terminal to second telephone terminal or first telephone terminal possessed by the user; and
the call agent, in response to the request, controls a called first telephone terminal to transit the call session to voice call to the second telephone terminal or video-phone call or voice call to the first telephone terminal.

18. A service center, used in a video-phone communication system allowing a plurality of cellular phones to communicate with each other through a cellular phone network, wherein the service center is connected to the cellular phone network and to a detector through another network other than the cellular phone network, the service center comprising:
a unit for receiving from a detector a detected identifier assigned to a first cellular phone by the service center and displayed on the first cellular phone;
a unit for determining a public communication terminal relating to the first cellular phone to which the identifier is assigned;
a unit for preparing communication data and conveying the communication data to a second cellular phone, wherein the communication data is composed of a stream of voice from the cellular phone and a stream of video from the public communication terminal;
a unit for dividing the a stream of voice and a stream of video from the second cellular phone, and sending the divided stream of voice from the second cellular phone to the first cellular phone, and the divided stream of video from the second cellular phone to the public communication terminal; and
a unit for receiving from the cellular phone network a copy of packets in a telephone format transmitted from the first cellular phone presenting the identifier to the second cellular phone.

19. A service center according to claim 18, wherein:
the copy of packets received by the service center includes voice and video, the service center adds or composes video with another video to transmit to a cellular phone network.

20. A cellular phone, used for communication according to claim 18, wherein:
a button on the cellular phone is allocated to send an identifier, and the user operating the button causes identifier information to be transmitted.

21. A service center according to claim 19, wherein:
the copy of packets including voice and video is composed of a stream of voice and video;
another video is composed of a stream of video; and
the number of pixels is different between a video frame of the stream of voice and video and a video frame of the stream of video, and the smaller one of the frames is embedded into the larger one of the frames.

22. A service center according to claim 21, wherein:
the larger one of video streams is generated by an encoder, a video encoder performs intra-frame coding and inter-frame differential encoding, and moving vector detection is not performed for the area of the larger frame to embed the smaller frame during differential encoding.

23. A service center according to claim 21, wherein:
any one of encoder for encoding video of embedded smaller frame and encoder for encoding video of embedding larger frame is presented with quantize coefficient by the other to control the bit rate of the stream of video and voice output from the composing service of the stream of voice and video with the stream of video.

24. A service center according to claim 19, wherein:
the copy of packets including voice and video are composed of a stream of voice and video;
another video is composed of a stream of video; and
a transport stream is output comprised of one voice stream and a plurality of video stream, by sequentially interlacing one frame of voice and video from the voice and video stream with one frame of the video stream.

25. A service center according to claim 24, wherein:
a transport stream is comprised of voice and a plurality of video streams, the number of pixels in a frame is different among the plurality of video streams, and a smaller frame is embedded into a larger one for reproducing.

26. A service center according to claim 25, wherein:
the transport stream is added with display attribute information by the composition outputting the transport stream, and is reproduced in accordance with the display attribute information.

27. A communication method for performing voice and video communication under the control of a service center, by means of cellular phone terminals, through a communication network, comprising:
communicating voice data and video data between the service center and a first telephone terminal;
communicating information including voice data other than the video data between the service center and a second telephone terminal;
assigning an identifier to the second telephone terminal for each communication in response to a request from the second telephone terminal;
determining and actuating a display device and a capturing device in the vicinity of the second telephone terminal based on the identifier for service relating to the second telephone terminal; and
performing transmission/reception of video data between the service center and the display device or capturing device for service relating to the second telephone terminal.

28. A service center communicating between the first terminal enabling video communication and the second terminal enabling voice communication through a network, comprising:
a unit for assigning an identifier to the second terminal per each communication;

a unit for determining a public communication terminal relating to the second terminal according to the identifier;

a unit for dividing voice data and video data from video communication data after receiving the video communication data from the first terminal and sending the video data to the public communication terminal corresponding to the second terminal and the voice data to the second terminal; and a unit for receiving the voice data from the second terminal and the video data from the public communication terminal, preparing the video communication data by composing the voice data and the video and sending the video communication data to the first terminal.

29. A service center according to claim 28, further comprising:

a detector corresponding to said public communication terminal for detecting the identifier assigned to the second terminal;

a unit for receiving the identifier from said detector; wherein: said determining unit determines the public communication terminal in which the corresponding detector detects the identifier as the public communication terminal corresponding to the second terminal.

30. A service center according to claim 29, where:

said detector detects the identifier by capturing video displayed on the second terminal.

31. A service center according to claim 29, wherein:

said detector is set near said public communication terminal.

* * * * *